US012671330B2

(12) United States Patent
Tsekouras

(10) Patent No.: US 12,671,330 B2
(45) Date of Patent: Jun. 30, 2026

(54) CONTROL METHOD FOR SWITCHED-MODE POWER SUPPLIES

(71) Applicant: DOLBY LABORATORIES LICENSING CORPORATION

(72) Inventor: Ellis George Tsekouras, Sydney (AU)

(73) Assignee: DOLBY LABORATORIES LICENSING CORPORATION

( * ) Notice: Subject to any disclaimer, the term of this patent is extended or adjusted under 35 U.S.C. 154(b) by 89 days.

(21) Appl. No.: 18/845,240

(22) PCT Filed: Mar. 9, 2023

(86) PCT No.: PCT/US2023/064071
§ 371 (c)(1),
(2) Date: Sep. 9, 2024

(87) PCT Pub. No.: WO2023/173040
PCT Pub. Date: Sep. 14, 2023

(65) Prior Publication Data
US 2025/0192674 A1      Jun. 12, 2025

Related U.S. Application Data

(60) Provisional application No. 63/318,836, filed on Mar. 11, 2022.

(30) Foreign Application Priority Data

Mar. 11, 2022    (EP) .................................... 22161555

(51) Int. Cl.
*H02M 3/156*       (2006.01)
*G06F 1/26*        (2006.01)
*H02M 1/00*        (2007.01)

(52) U.S. Cl.
CPC ............ *H02M 3/156* (2013.01); *G06F 1/263* (2013.01); *H02M 1/0025* (2021.05)

(58) Field of Classification Search
CPC ...... H02M 3/156; H02M 1/0025; G06F 1/263
See application file for complete search history.

(56) References Cited

U.S. PATENT DOCUMENTS

| | | | |
|---|---|---|---|
| 6,912,139 B2 | 6/2005 | Kernahan | |
| 6,977,492 B2 | 12/2005 | Sutardja | |

(Continued)

FOREIGN PATENT DOCUMENTS

| | | | |
|---|---|---|---|
| CN | 201403048 | Y | 2/2010 |
| CN | 108258900 | B | 12/2019 |
| WO | 2020129040 | A1 | 6/2020 |

OTHER PUBLICATIONS

Adaptive Controller with Mode Tracking and Parametric Estimation (Year: 2007).*

(Continued)

*Primary Examiner* — Kim Huynh

(57) ABSTRACT

Systems and methods for controlling switched-mode power supplies. One system includes a converter including a switch and an inductor and processor to control operation of the converter. The processor is configured to determine whether a predicted value of current flowing through the inductor is greater than zero. The processor is further configured to determine the converter is operating in continuous conduction mode (CCM) when the predicted value of the current is greater than zero and control the switch using a first duty cycle when the converter is operating in CCM. The processor is further configured to determine the converter is operating in discontinuous conduction mode (DCM) when the predicted value of the current is less than zero and (Continued)

control the switch using a second duty cycle when the converter is operating in DCM.

18 Claims, 15 Drawing Sheets

(56)                    References Cited

U.S. PATENT DOCUMENTS

| | | | |
|---|---|---|---|
| 7,265,522 B2 | 9/2007 | Sutardja | |
| 7,804,256 B2 | 9/2010 | Melanson | |
| 8,363,435 B2 | 1/2013 | Kris | |
| 8,598,856 B1 | 12/2013 | Carroll et al. | |
| 8,749,994 B2 | 6/2014 | Kleinpenning | |
| 8,766,570 B2 | 7/2014 | Geyer | |
| 9,553,511 B2 | 1/2017 | Louvel | |
| 9,595,869 B2 | 3/2017 | Lerdworatawee | |
| 9,768,697 B2 | 9/2017 | Fahlenkamp | |
| 10,135,272 B2 | 11/2018 | Fahlenkamp | |
| 2008/0042709 A1* | 2/2008 | Chen .................... | H02M 3/156 |
| | | | 327/175 |
| 2014/0203790 A1* | 7/2014 | Xiao ..................... | H02M 3/156 |
| | | | 323/271 |
| 2019/0006943 A1* | 1/2019 | Grimaud .......... | H02M 3/33507 |
| 2019/0123644 A1 | 4/2019 | Pazhayaveetil et al. | |
| 2019/0386561 A1* | 12/2019 | King ...................... | H02M 1/42 |
| 2021/0126522 A1* | 4/2021 | Preindl ................ | H02M 3/158 |

OTHER PUBLICATIONS

Switching Regulator Fundamentals (Year: 2019).*
Candan Muhammed Yusuf et al, "Extended Kalman Filter Based State and Parameter Estimation Method for a Buck Converter Operating in a Wide Load Range", IEEE Energy Conversion Congress and Exposition (ECCE), IEEE, Oct. 11, 2020, 7 Pages.
Dietrich Stefan et al: "Get the LED Out: Experimental Validation of a Capacitor-Free Single-Inductor, Multiple-Output LED Driver Topology", IEEE Industrial Electronics Magazine, IEEE, US, vol. 9, No. 2, Jun. 1, 2015, pp. 24-35.
L. Cheng et al., "Model Predictive Control for DC-DC Boost Converters With Reduced-Prediction Horizon and Constant Switching Frequency," In IEEE Transactions on Power Electronics, vol. 33, No. 10, Oct. 2018, pp. 9064-9075.
Van Der Broeck Christoph H et al. "Unified Control of a Buck Converter for Wide-Load-Range Applications", IEEE Transactions on Industry Applications, IEEE Service Center, Piscataway, NJ, US vol. 51, No. 5, Sep. 1, 2015, pp. 4061-4071.
Zhang et al., "A New Duty Cycle Control Strategy for Power Factor Correction and FPGA Implementation" IEEE Transactions on Power Electronics, vol. 21, Issue: 6, Nov. 13, 2006, pp. 1745-1753.

* cited by examiner

1100

DETERMINE DYNAMIC INDUCTOR CURRENT REFERENCE — 1102

DETERMINE STEADY STATE INDUCTOR CURRENT REFERENCE — 1104

NORMALIZE OUTPUT VOLTAGE TRACKING ERROR — 1106

DETERMINE AVERAGE INDUCTOR CURRENT SETPOINT — 1108

OUTPUT AVERAGE INDUCTOR CURRENT SETPOINT — 1110

CONTROL METHOD FOR SWITCHED-MODE POWER SUPPLIES

CROSS-REFERENCE TO RELATED APPLICATIONS

This application is a U.S. National Stage application under U.S.C. 371 of International Application No. PCT/US2023/64071, filed on 9 Mar. 2023, which claims priority from U.S. Provisional Application No. 63/318,836 filed on 11 Mar. 2022 and from European Patent Application 22161555.2 filed on Mar. 11, 2022.

BACKGROUND

Field of the Disclosure

This application relates generally to systems and methods of controlling switched-mode power supplies.

BRIEF SUMMARY OF THE DISCLOSURE

Switched-mode power supplies included in portable devices, such as battery-powered speakers, are often inefficient. Accordingly, techniques for controlling switched-mode power supplies included in such portable devices have been developed. Techniques may further account for device characteristics of circuit components included in the switched-mode power supplies.

Various aspects of the present disclosure relate to devices, systems, and methods for controlling switched-mode power supplies.

In one example aspect of the present disclosure, there is provided a switched-mode power supply comprising: a voltage source, an output device, a converter including an inductor and a switch, the converter configured to convert unregulated direct current (DC) voltage received from the voltage source to a regulated DC voltage used for powering the output device, and a controller including one or more electronic processors. The controller is configured to determine whether a predicted value of current flowing through the inductor is greater than zero, determine the converter is operating in continuous conduction mode (CCM) when the predicted value of the current is greater than zero, control the switch using a first duty cycle when the converter is operating in CCM, determine the converter is operating in discontinuous conduction mode (DCM) when the predicted value of the current is less than zero, and control the switch using a second duty cycle when the converter is operating in DCM.

In another example aspect of the present disclosure, there is provided a method for controlling a switched-mode power supply, the switched-mode power supply including a converter circuit that includes and inductor and a switch, the method comprising determining whether a predicted value of current flowing through the inductor is greater than zero, determining the converter circuit is operating in continuous conduction mode (CCM) when the predicted value of the current is greater than zero, controlling the switch using a first duty cycle when the converter is operating in CCM, determining the converter is operating in discontinuous conduction mode (DCM) when the predicted value of the current is less than zero, and controlling the switch using a second duty cycle when the converter is operating in DCM.

In another example aspect of the present disclosure, there is provided a non-transitory computer-readable medium storing instructions that, when executed by a processor of an image delivery system, cause the image delivery system to perform operations comprising determining whether a predicted value of current flowing through the inductor is greater than zero, determining the converter circuit is operating in continuous conduction mode (CCM) when the predicted value of the current is greater than zero, controlling the switch using a first duty cycle when the converter is operating in CCM, determining the converter is operating in discontinuous conduction mode (DCM) when the predicted value of the current is less than zero, and controlling the switch using a second duty cycle when the converter is operating in DCM.

In this manner, various aspects of the present disclosure provide for the control of switched-mode power supplies and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure, and does not limit the scope of the disclosure in any way.

In the following description, numerous details are set forth, such as audio device configurations, timings, operations, and the like, in order to provide an understanding of one or more aspects of the present disclosure. It will be readily apparent to one skilled in the art that these specific details are merely examples and not intended to limit the scope of this application.

Switched-Mode Power Supply

Figure 1:
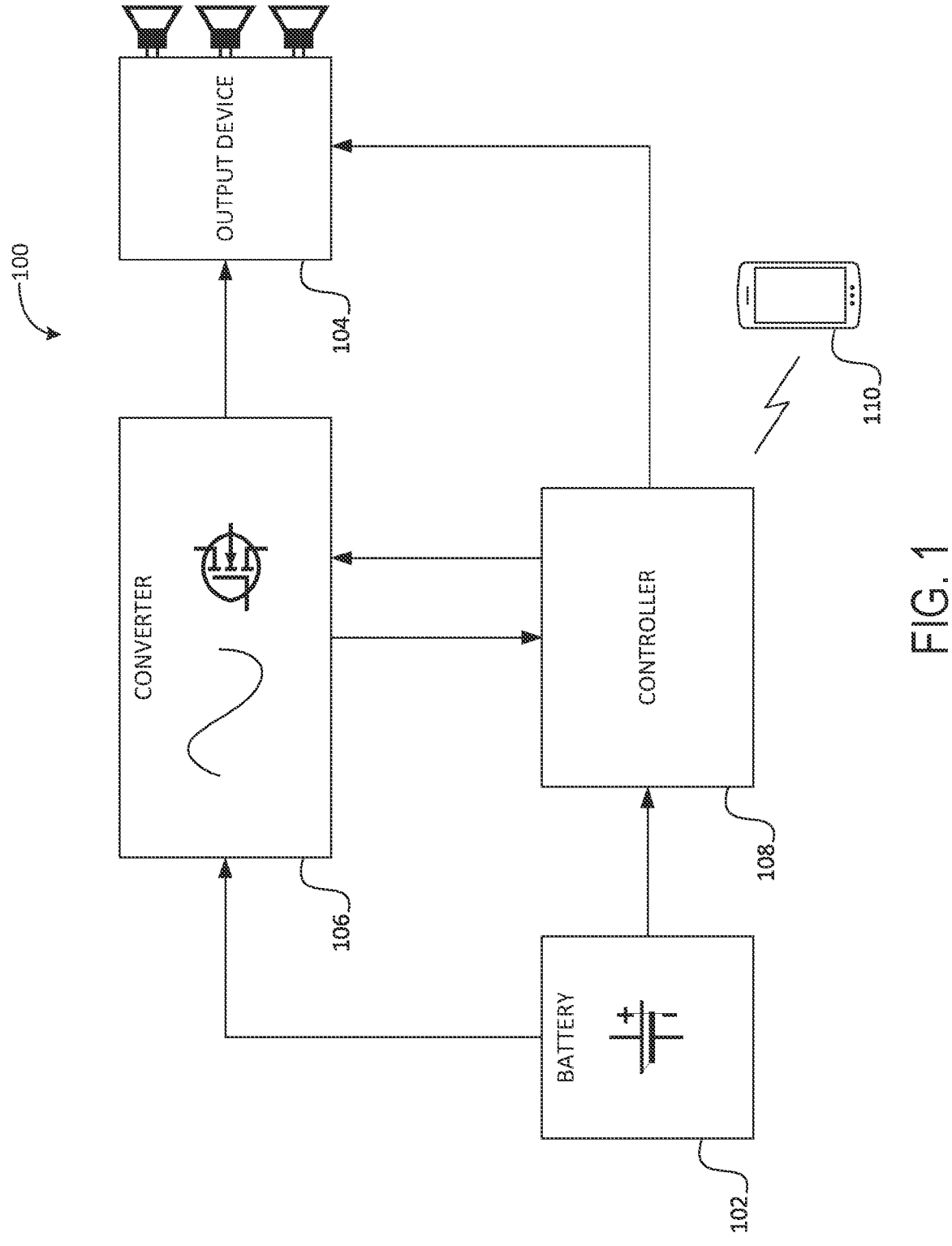
FIG. 1 depicts an example block diagram for a switched-mode power supply system.

FIG. 1 depicts an example control system of a switched-mode power supply (SMPS) 100. The SMPS 100 includes a voltage source 102 that provides unregulated direct current (DC) voltage for powering an output device 104. In the illustrated embodiment, the voltage source 102 is implemented as a battery having a lithium chemistry. However, in other embodiments, other types of voltage sources may be used to implement the voltage source 102. For example, the voltage source 102 may be implemented as a battery having a different chemistry, such as nickel cadmium or lead acid.

As shown, unregulated DC voltage is provided from the voltage source 102 to a converter 106 included in the SMPS 100. As will be described in more detail below, the converter 106 may be implemented as a boost converter, such as a non-synchronous boost converter. The converter 106 is configured to convert the unregulated DC voltage received from voltage source 102 to a regulated DC voltage used for powering the output device 104.

The output device 104 of the illustrated embodiment is implemented as an audio output device, which may include one or more amplifiers, drivers, and/or speakers. Thus, the SMPS 100 of the illustrated embodiment may be implemented as an SMPS included in a portable audio device, such as a portable battery-powered speaker. However, it should be understood that the implementation of SMPS 100 should not be limited to audio applications. For example, in some embodiments, the output device 104 may additionally or alternatively be implemented as a display device or some other visual output device.

The SMPS 100 further includes the controller 108, which includes one or more electronic processors, memory devices, and/or other modules that are used for controlling operation of the components included in SMPS 100. For example, the controller 108 may be implemented as a microchip microcontroller that is configured to execute one or more software control algorithms for controlling operation of the SMPS. As shown, the controller 108 is configured to control operation of the converter 106 based in-part on signals received from the voltage source 102 and/or the converter 106. Control of the converter 106 will be described in more detail below.

In some embodiments, the controller 108 is further configured to control operation of the output device 104. For example, in the illustrated embodiment, the controller 108 is configured to provide a digital audio control signal to the output device 104. In some embodiments, the digital audio control signal may be a signal stored in a memory of the controller 108. In some embodiments, the digital audio control signal is received from an external device 110, such as a smartphone. For example, the controller 108 may include a Bluetooth module, or System-on-Chip (Soc), that is configured to wirelessly receive digital audio signals from the external device 110. Accordingly, the controller 108 is configured to control the output device 104 and converter 106 based in part on the digital audio signals received from the external device 110.

Boost Converter Model

Figure 2:
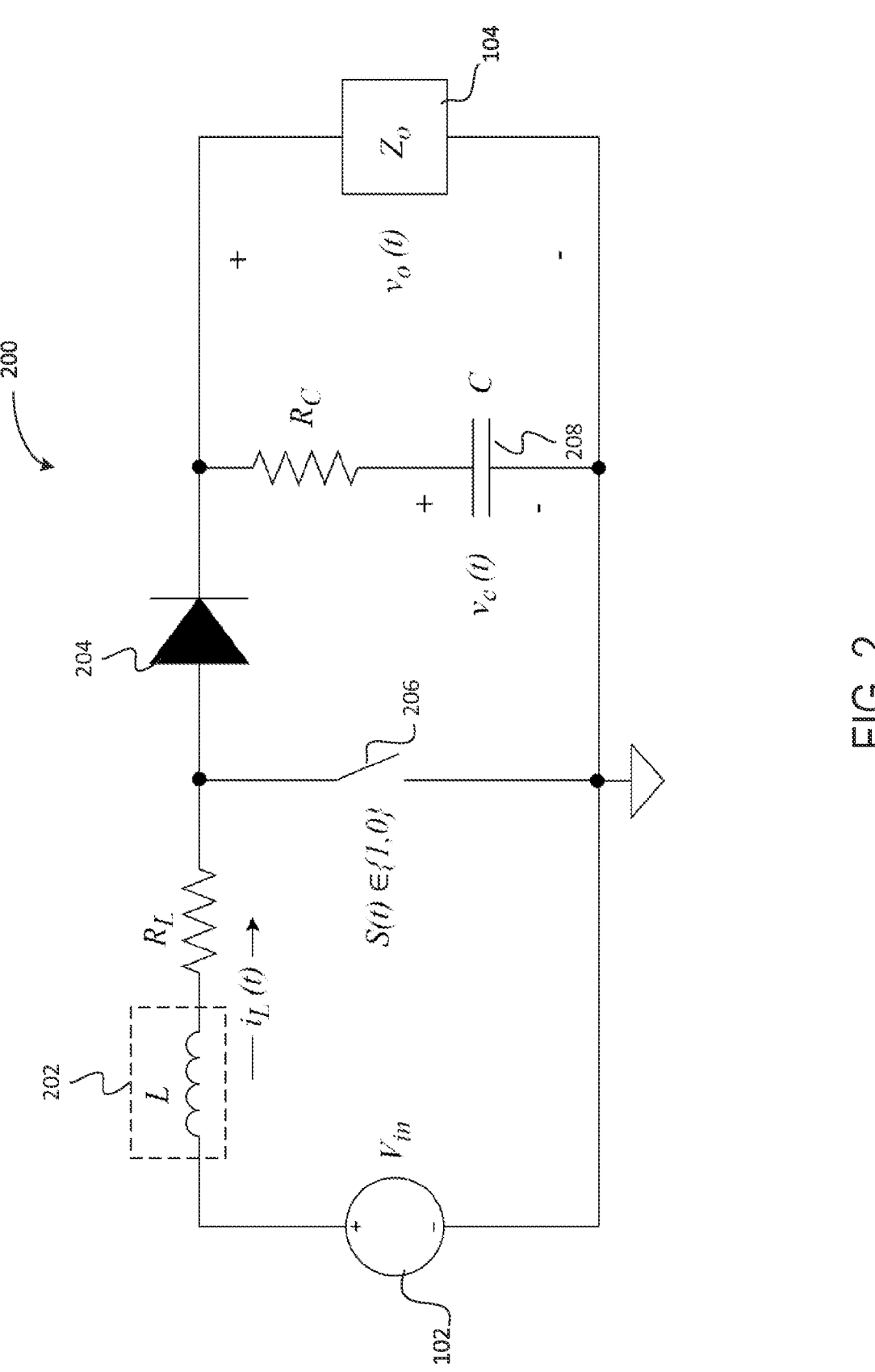
FIG. 2 depicts an example circuit for a converter.

In operation, the controller 108 is configured to control operation of the converter 106 based on a model of the SMPS 100. In particular, a model of the converter 106, such as the boost converter circuit 200 illustrated in FIG. 2, is used by controller 108 to control operation of the SMPS 100. As shown in the circuit 200 of FIG. 2, the unregulated DC voltage provided by voltage source 102 is modeled as the input voltage ($V_{in}$) and the output device 104 is modeled as an output, or load, impedance ($Z_o$). The output voltage of the converter 106, or the voltage across the output impedance, is modeled as ($v_o(t)$).

In addition, various components, currents, and voltages within the converter 106 are modeled as follows. The converter 106 includes an inductor 202 having an input inductance (L) and a resistance ($R_L$). An inductor current ($i_L(t)$) flows through the inductor 202. The converter 106 further includes an ideal diode 204 (or a switch if a synchronous topology is adopted) and a switch 206 that is represented as a function (S(t)). A capacitor 208 included in converter 106 has a capacitance (C) and an output resistance ($R_C$). The voltage across the capacitor 208 is modeled as ($v_c(t)$).

As will be described in more detail below, the controller 108 is configured to control operation of the converter 106 based on the voltages across and/or currents flowing through various components included in SMPS 100. The voltages and currents are expressed by the various equations described herein, which are dependent in-part on the operating state of the converter 106.

Continuous Conduction Mode

Figure 3A:
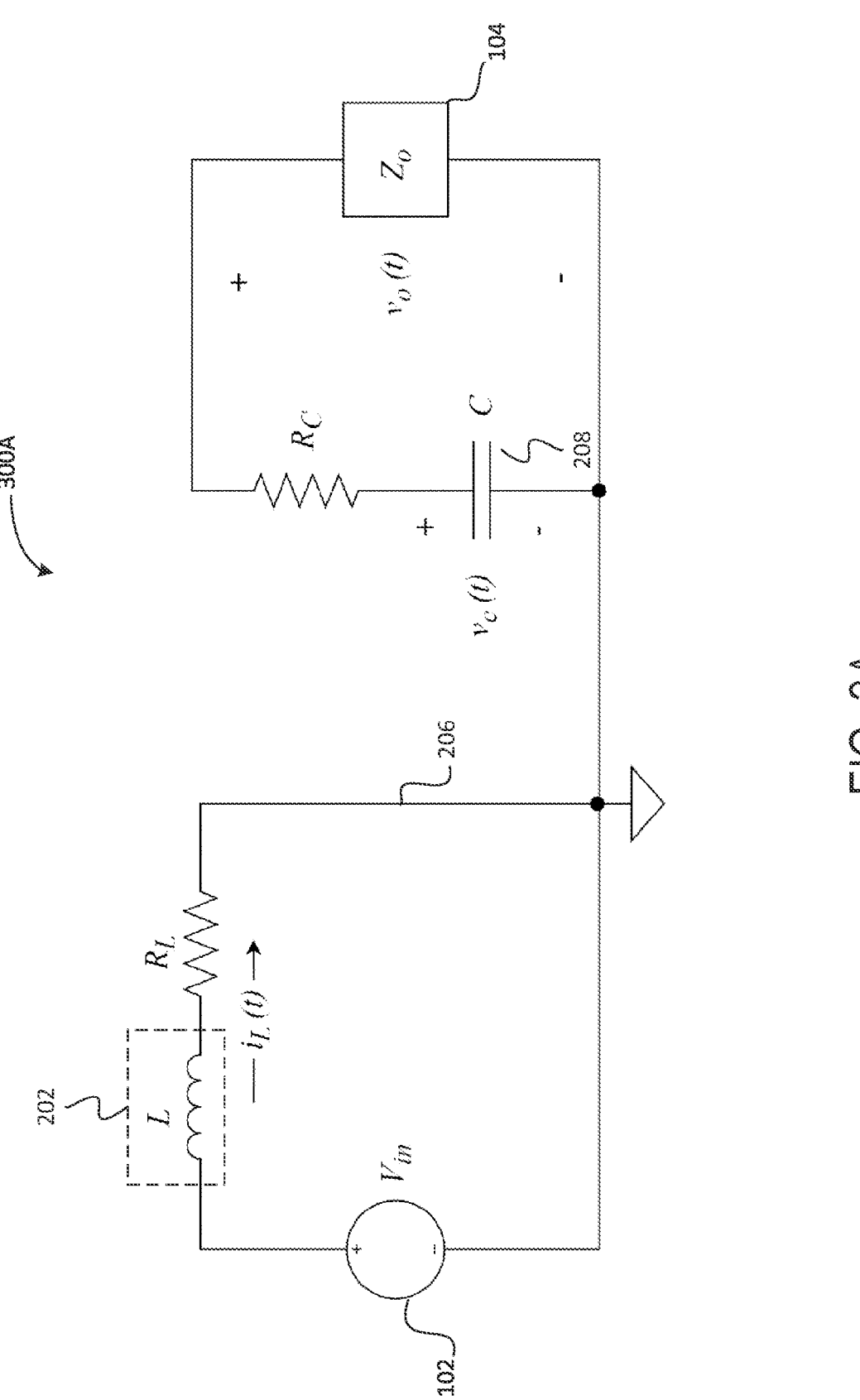
FIG. 3A depicts an example equivalent circuit of the converter of FIG. 2 operating prior to entering continuous conduction mode or discontinuous conduction mode.

FIG. 3A illustrates an equivalent circuit 300A of the converter 106 when the converter 106 is operating in a continuous conduction mode (CCM) and the switch 206 is turned ON. By using Kirchhoff's Voltage Law (KVL) to solve the left-hand loop of circuit 300A, the change in current flowing through inductor 202 when the converter 106 operates in CCM and switch 206 is ON can be expressed by Equation 1:

$$V_{in} = V_L(t) + i_L(t) * R_L \qquad \text{[Equation 1]}$$

$$V_{in} = \frac{di_L(t)}{dt} * L + i_L(t) * R_L$$

$$\frac{di_L(t)}{dt} = \frac{V_{in}}{L} - \frac{R_L}{L} * i_L(t)$$

Similarly, by using KVL to solve the right-hand loop of the circuit 300A, the change in voltage across capacitor 208 when the converter 106 operates in CCM and switch 206 is ON can be expressed by Equation 2:

$$0 = i_C(t)R_C + v_C(t) + i_C(t)Z_O \qquad \text{[Equation 2]}$$

$$0 = \frac{dv_c(t)}{dt}C(R_C + Z_O) + v_C(t)$$

$$\frac{dv_c(t)}{dt} = -\frac{1}{C(R_C + Z_O)}v_C(t)$$

In addition, the output voltage of converter 106 while the converter 106 operates in CCM and switch 206 is turned ON is expressed by Equation 3:

$$v_O(t) = v_C(t)\frac{Z_O}{Z_O + R_C} \qquad \text{[Equation 3]}$$

Accordingly, Equations 1, 2, and 3 can be combined to yield a state space model for converter 106 while the converter 106 operates in CCM and the switch 206 is turned ON. This state space model is expressed by Equations 4 and 5:

$$\begin{bmatrix} \frac{di_L}{dt} \\ \frac{dv_C}{dt} \end{bmatrix} = \begin{bmatrix} -\frac{R_L}{L} & 0 \\ 0 & -\frac{1}{C(R_C + Z_O)} \end{bmatrix} \begin{bmatrix} i_L \\ v_C \end{bmatrix} + \begin{bmatrix} \frac{1}{L} \\ 0 \end{bmatrix} * V_{in} = \qquad \text{[Equation 4]}$$

$$\dot{x} = Ax + EV_{in}$$

$$v_O = \begin{bmatrix} 0 & \frac{Z_O}{Z_O + R_C} \end{bmatrix} \begin{bmatrix} i_L \\ v_C \end{bmatrix} = y = Cx \qquad \text{[Equation 5]}$$

Figure 3B:
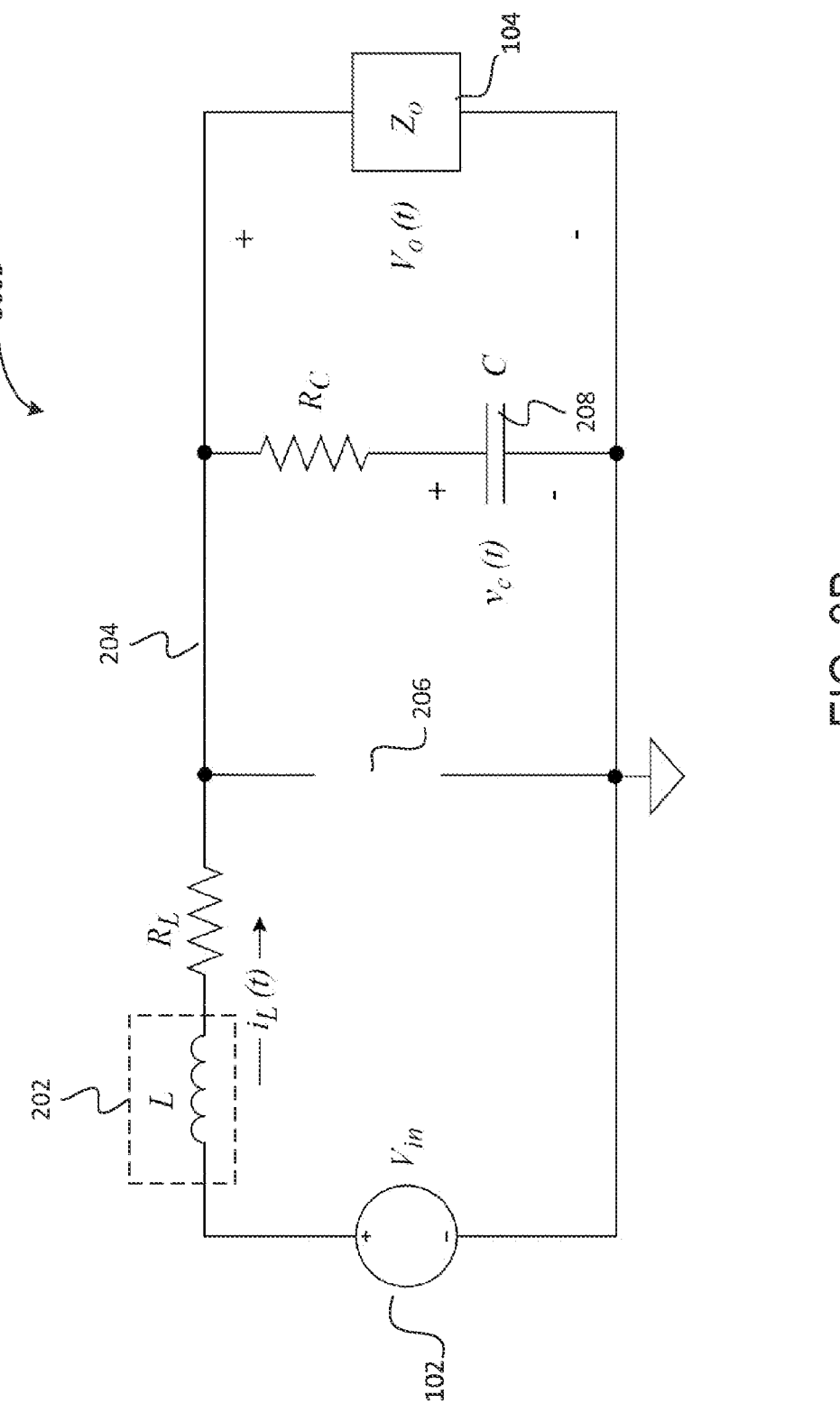
FIG. 3B depicts another example equivalent circuit of the converter of FIG. 2 operating in a continuous conduction mode.

FIG. 3B illustrates an equivalent circuit 300B of the converter 106 while the converter 106 operates in CCM and the switch 206 is turned OFF. By using mesh current analysis to solve the left-hand loop of circuit 300B, the change in current flowing through inductor 202 when the converter 106 operates in CCM and switch 206 is OFF can be expressed by Equation 6:

$$0 = -V_{in} + \frac{di_L(t)}{dt}L + i_L(t)R_L + R_C(i_L(t) - i_O(t)) + v_C(t) \qquad \text{[Equation 6]}$$

$$\frac{di_L}{dt} = -\frac{R_L}{L}i_L(t)(\ ) - \frac{1}{L}v_C(t) - \frac{dv_C}{dt}\frac{R_C C}{L} + \frac{V_{in}}{L}$$

Similarly, by using KVL to solve the right-hand loop of the circuit 300B, the voltage derivative of capacitor 208 while the converter 106 operates in CCM and switch 206 is OFF can be expressed by Equation 7:

$$0 = -v_C(t) - R_C(i_O(t) - i_L(t)) + i_O(t)Z_O \qquad \text{[Equation 7]}$$

$$\frac{dv_c}{dt} = \frac{Z_O}{C*(R_C + Z_O)}i_L - \frac{1}{C*(R_C + Z_O)}V_C$$

When Equations 6 and 7 are combined and the voltage derivative of capacitor 208 is removed from each side of the combination, the change in current flowing through inductor 202 while converter 106 operates in CCM and the switch 206 is turned OFF can be expressed by Equation 8:

$$\frac{di_L}{dt} = \left(\frac{R_L}{L} + \frac{Z_O R_C}{L(R_C + Z_O)}\right)i_L(t) - \left(\frac{Z_O}{L*(R_C + Z_O)}\right)v_C(t) + \frac{V_{in}}{L} \qquad \text{[Equation 8]}$$

Furthermore, the output voltage of converter 106 while the converter 106 operates in CCM and switch 206 is turned OFF can be expressed by Equation 9:

$$v_O(t) = \frac{R_C}{R_C + Z_O}i_L(t) + \frac{Z_O}{R_C + Z_O}v_C(t) \qquad \text{[Equation 9]}$$

Accordingly, Equations 7, 8, and 9 can be combined to yield a state space model for converter 106 while the converter 106 operates in CCM and the switch 206 is turned OFF. This state space model is expressed by Equations 10 and 11:

$$\begin{bmatrix} \frac{di_L}{dt} \\ \frac{dv_C}{dt} \end{bmatrix} = \begin{bmatrix} \frac{R_L}{L} + \frac{Z_O R_C}{L(R_C + Z_O)} & -\frac{Z_O}{L(R_C + Z_O)} \\ \frac{Z_O}{C(R_C + Z_O)} & -\frac{1}{C(R_C + Z_O)} \end{bmatrix} \qquad \text{[Equation 10]}$$

$$\begin{bmatrix} i_L \\ v_C \end{bmatrix} + \begin{bmatrix} \frac{1}{L} \\ 0 \end{bmatrix} * V_{in} = \dot{x} = Ax + EV_{in}$$

$$v_O = \begin{bmatrix} \frac{R_C Z_O}{R_C + Z_O} & \frac{Z_O}{Z_O + R_C} \end{bmatrix} \begin{bmatrix} i_L \\ v_C \end{bmatrix} = y = Cx \qquad \text{[Equation 11]}$$

Discontinuous Conduction Mode

Figure 4:
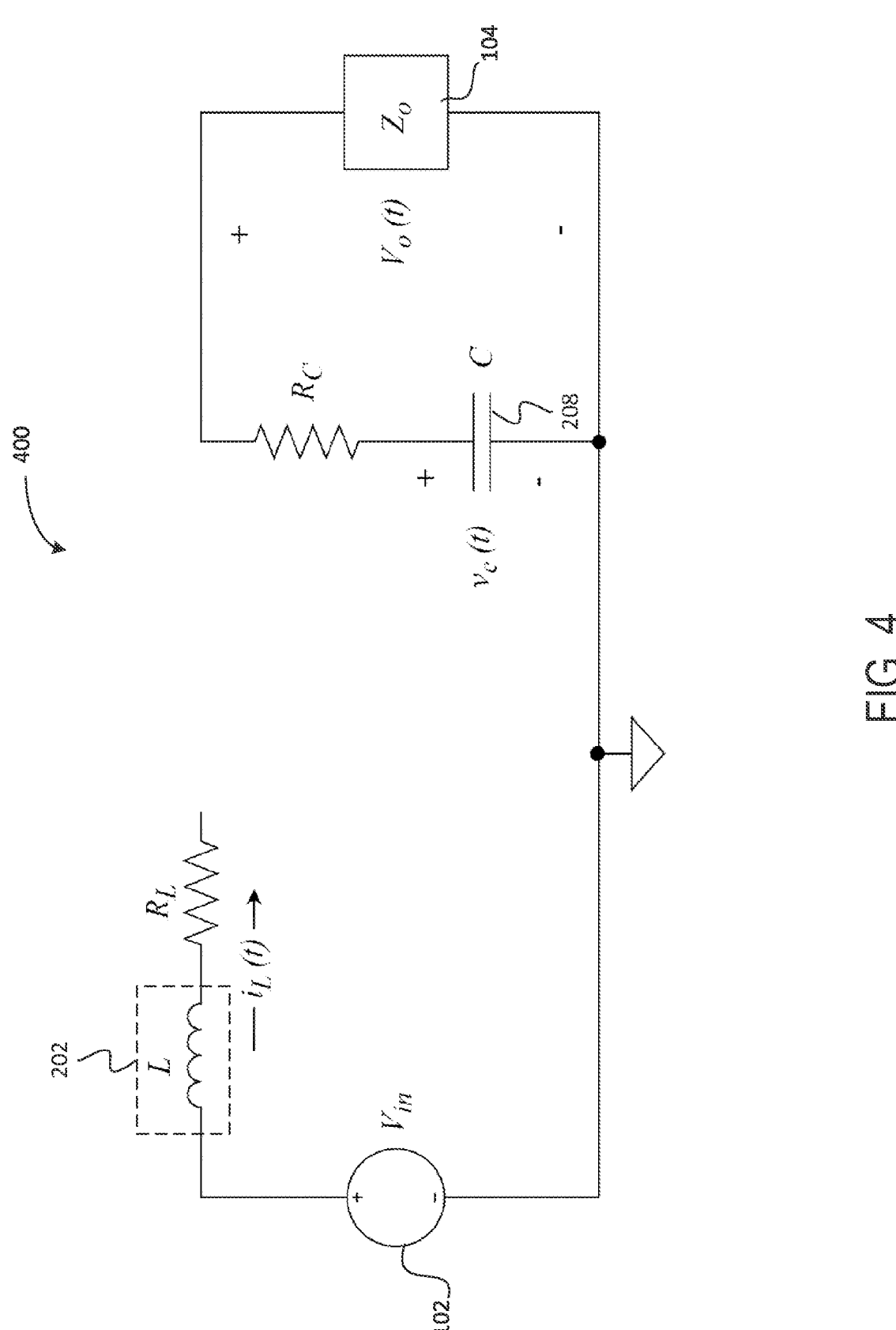
FIG. 4 depicts an example equivalent circuit of the converter of FIG. 2 operating in a discontinuous conduction mode.

FIG. 4 illustrates an equivalent circuit 400 of the converter 106 while the converter 106 is operating in a discontinuous conduction mode (DCM). While the converter 106 operates in DCM and the switch 206 is turned ON, behavior of circuit 400 is identical to the behavior of circuit 300A while converter 106 operates in CCM and switch 206 is turned ON. While the converter 106 operates in DCM and the switch 206 is turned OFF, the current flowing through inductor 202 is zero and the diode 204 is not conducting. Thus, Equations 1, 2, and 3 are combined to yield a state space model for converter 106 while the converter 106 operates in DCM and the switch 206 is turned OFF. This state space model is expressed by Equations 12 and 13 below:

$$\begin{bmatrix} \frac{di_L}{dt} \\ \frac{dv_C}{dt} \end{bmatrix} = \begin{bmatrix} 0 & 0 \\ 0 & -\frac{1}{C*(R_C + Z_O)} \end{bmatrix} \begin{bmatrix} i_L \\ v_C \end{bmatrix} + \qquad \text{[Equation 12]}$$

$$\begin{bmatrix} \frac{1}{L} \\ 0 \end{bmatrix} V_{in} = \dot{x} = Ax + EV_{in}$$

$$v_O = \begin{bmatrix} 0 & \frac{Z_O}{Z_O + R_C} \end{bmatrix} \begin{bmatrix} i_L \\ v_C \end{bmatrix} = y = Cx \qquad \text{[Equation 13]}$$

Complete State Space Model

As described above and defined by Equations 1-13, all possible operating modes of converter 106 and operating states of switch 206 have been considered. Accordingly, Equations 4, 5, and 10-13 can be combined to define a complete state space model of the converter 106. As will be described in more detail below, the controller 108 is configured to control operation of the SMPS 100 based in-part on the complete state space model of converter 106, which is expressed by Equations 14 and 15. With respect to Equations 14 and 15, $d_{aux}=1$ while converter 106 operates in CCM and $d_{aux}=0$ while converter 106 operates in DCM.

$$\dot{x} = A(u)x + EV_{in} \qquad \text{[Equation 14]}$$

$$\begin{bmatrix} \frac{di_L}{dt} \\ \frac{dv_C}{dt} \end{bmatrix} =$$

$$\begin{bmatrix} -d_{aux}\frac{R_L}{L} + (S(t) - d_{aux})\left(\frac{R_C Z_O}{L(R_C + Z_O)}\right) & (S(t) - d_{aux})\left(\frac{Z_O}{L(R_C + Z_O)}\right) \\ (d_{aux} - S(t))\left(\frac{Z_O}{C(R_C + Z_O)}\right) & -\frac{1}{C(R_C + Z_O)} \end{bmatrix}$$

-continued $$\left[ \begin{matrix} i_L(t) \\ v_C(t) \end{matrix} \right] + \left[ \begin{matrix} \frac{d_{aux}}{L} \\ 0 \end{matrix} \right] V_{in}$$

$$y = C(u)x \qquad \text{[Equation 15]}$$

$$v_O(t) = \left[ (d_{aux} - S(t)) \left( \frac{R_C Z_O}{(R_C + Z_O)} \right) \quad \frac{Z_O}{Z_O + R_C} \right] \left[ \begin{matrix} i_L(t) \\ v_C(t) \end{matrix} \right]$$

However, since the controller 108 is configured to execute a digital control algorithm when controlling operation of the SMPS 100, a first-order Euler approximation is applied to the continuous-time state-space model of Equations 14 and 15 to create a discretized state space model of converter 106. The complete discrete state space model of the converter (106) is expressed by Equations 16 and 17:

$$x[k+1] = Ax[k] + B(x[k])S[k] + EV_{in} \qquad \text{[Equation 16]}$$

$$\left[ \begin{matrix} i_L[k+1] \\ v_C[k+1] \end{matrix} \right] =$$

$$\left[ \begin{matrix} d_{aux}T_S + \left( \frac{R_L(R_C + Z_O) + R_C}{(R_C + Z_O)} \right) & -d_{aux}T_S \left( \frac{Z_O}{L(R_C + Z_O)} \right) \\ d_{aux}T_S \left( \frac{T_S Z_O}{C(R_C + Z_O)} \right) & \frac{T_S}{C(R_C + Z_O)} - 1 \end{matrix} \right] \left[ \begin{matrix} i_L[k] \\ v_C[k] \end{matrix} \right] +$$

$$\left[ \begin{matrix} \left( \frac{R_C T_S Z_O}{L(R_C + Z_O)} \right) i_L[k] & \left( \frac{T_S Z_O}{C(R_C + Z_O)} \right) v_C[k] \\ \left( \frac{T_S Z_O}{C(R_C + Z_O)} \right) i_L[k] & 0 \end{matrix} \right] + S[k] + \left[ \begin{matrix} \frac{d_{aux}T_S}{L} \\ 0 \end{matrix} \right] V_{in}$$

$$y[k] = Cx[k] + D(x[k])S[k] \qquad \text{[Equation 17]}$$

$$v_O[k] = \left[ d_{aux} \left( \frac{R_C Z_O}{(R_C + Z_O)} \right) \quad \frac{Z_O}{Z_O + R_C} \right] \left[ \begin{matrix} i_L[k] \\ v_C[k] \end{matrix} \right] + \left[ -i_L[k] \frac{R_C Z_O}{(R_C + Z_O)} \right] S[k]$$

Digital Control Modules

Figure 5:
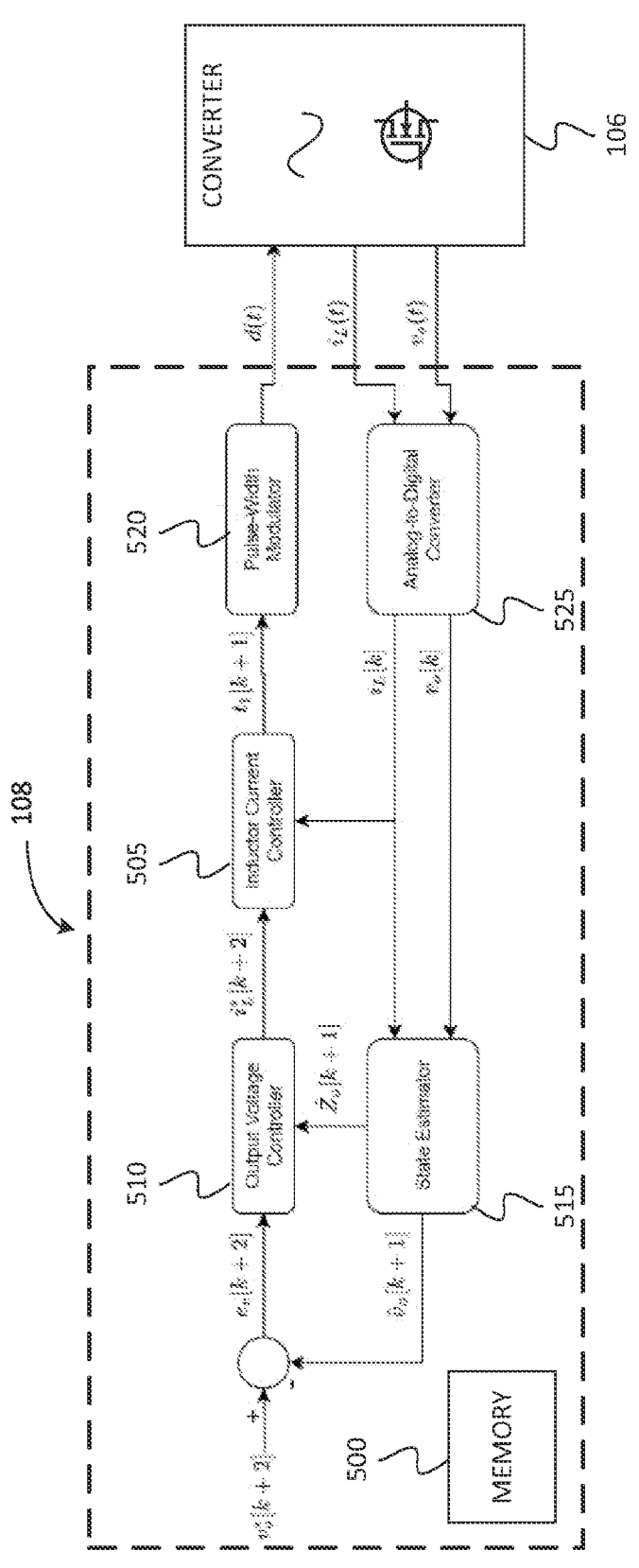
FIG. 5 depicts an example block diagram for a controller of the switched-mode power supply system of FIG. 1.

FIG. 5 illustrates a block diagram of the controller 108. As described above, the controller 108 may be implemented as microchip device that includes a plurality of electrical and electronic components for providing power, operational control, and protection to the components and modules within the controller 108 and/or the SMPS 100. For example, the controller 108 includes, among other things, a memory 500 and a plurality electronic processor modules. The plurality of electronic processor modules includes an inductor current controller 505, an output voltage controller 510, a state estimator 515, a pulse-width modulator (PWM) module 520, and an analog-to-digital converter (ADC) module 525. Although illustrated as separate modules within the controller 108, it should be understood that in some embodiments, the respective functionalities of the plurality of electronic processor modules may be performed by a single processor module or a single electronic processor included in the controller 108.

The memory 500 includes, for example, a program storage area and a data storage area. The program storage area and the data storage area may include combinations of different types of memory, such as read-only memory (ROM) and/or random-access memory (RAM). Various non-transitory computer readable media, for example, magnetic, optical, physical, or electronic memory may be used. The electronic processor modules are communicatively coupled to the memory 500 and execute software instructions that are stored in the memory 500, or stored on another non-transitory computer readable medium such as another memory or a disc. Instructions may include instructions, which when executed by the electronic processor modules, control operation of the voltage source 102, the output device 104, and/or the converter (106) as described herein. The software may include one or more applications, program data, filters, rules, one or more program modules, and other executable instructions.

Inductor Current Controller

The inductor current controller 505 is configured to control an amount of current flowing through the inductor 202. When provided with a inductor current reference, or setpoint, value from converter 106, the inductor current controller 505 is configured to calculate a duty cycle for controlling switch 206 that minimizes the inductor current tracking error. As will be described below, the algorithms and processes executed by inductor current controller 505 differ between operation of the converter 106 in CCM and operation of the converter 106 in DCM.

Figure 6:
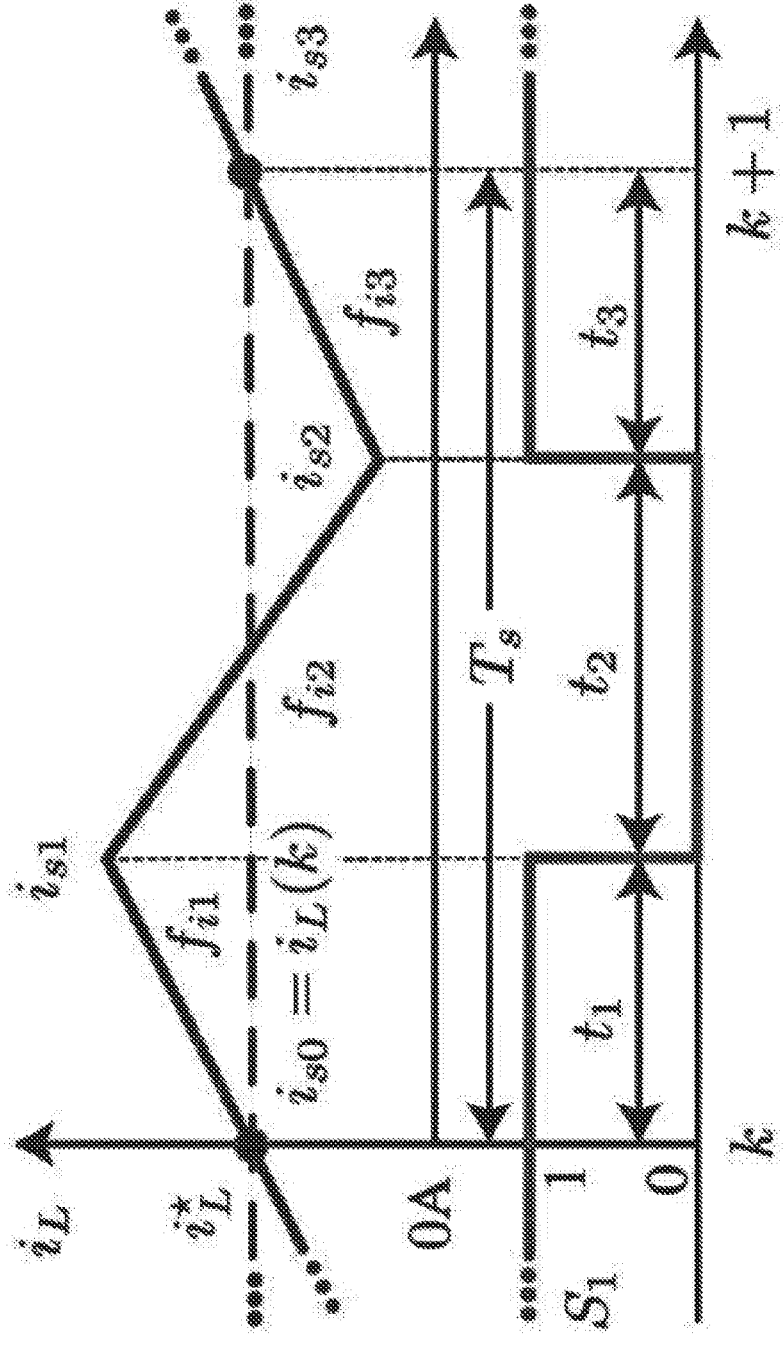
FIG. 6 depicts an example diagram of current flowing through an inductor included in a converter operating in continuous conduction mode.

FIG. 6 illustrates the evolution of inductor current ($i_L$) flowing through inductor 202 over the course of one sampling period ($T_s$) while the converter 106 operates in CCM. Equation 18 below expresses the steady state average inductor current over the course of one sampling period.

$$i_L^*[k+1] = i_{so} + \left( \frac{V_{in}[k]}{L} \right) t_1 + \left( \frac{V_{in}[k] - \hat{v}_o[k]}{L} \right) t_2 + \left( \frac{V_{in}[k]}{L} \right) t_3, \qquad \text{[Equation 18]}$$

$$\text{where } f_{i1} = \frac{V_{in}[k]}{L} = f_{i3} \text{ and } f_{i2} = \frac{V_{in}[k] - \hat{v}_o[k]}{L}$$

$$i_L^*[k+1] = i_L[k] + f_{i1}t_1 + f_{i2}t_2 + f_{i3}t_3$$

Since the on-time ($t_1$) of switch 206 is equal to time ($t_3$) and time ($t_2$) is equal to ($T_s$)$-2(t_1)$, Equation 18 can be rearranged to express the on-time of switch 206 required to minimize the tracking error. Accordingly, while the converter 106 operates in CCM, the inductor current controller 505 is configured to calculate the required on-time of switch 206 using Equation 19. Upon calculating the required on-time of switch 206, the inductor current controller 505 is further configured to control switch 206 with a duty cycle that is based on the calculated on-time. For example, the duty cycle is equivalent to the calculated on-time divided by the duration of one sampling period.

$$i_L^*[k+1] = i_L[k] + 2f_{i1}t_1 + f_{i2}(T_S - 2t_1) \qquad \text{[Equation 19]}$$

$$t_1 = \frac{i_L^*[k+1] - f_{i2}T_S}{2(f_{i1} - f_{i2})}$$

Referring again to FIG. 6, the inductor current decreases for a time ($t_2$) when switch 206 is turned OFF. In particular, the inductor current decreases to its lowest value, the inductor valley current, $i_{s2}$, over the duration of time ($t_2$). While the converter 106 operates in CCM, the inductor valley current is greater than zero. However, the converter 106 enters DCM operation when a predicted value of the inductor valley current is less than zero.

Figure 7:
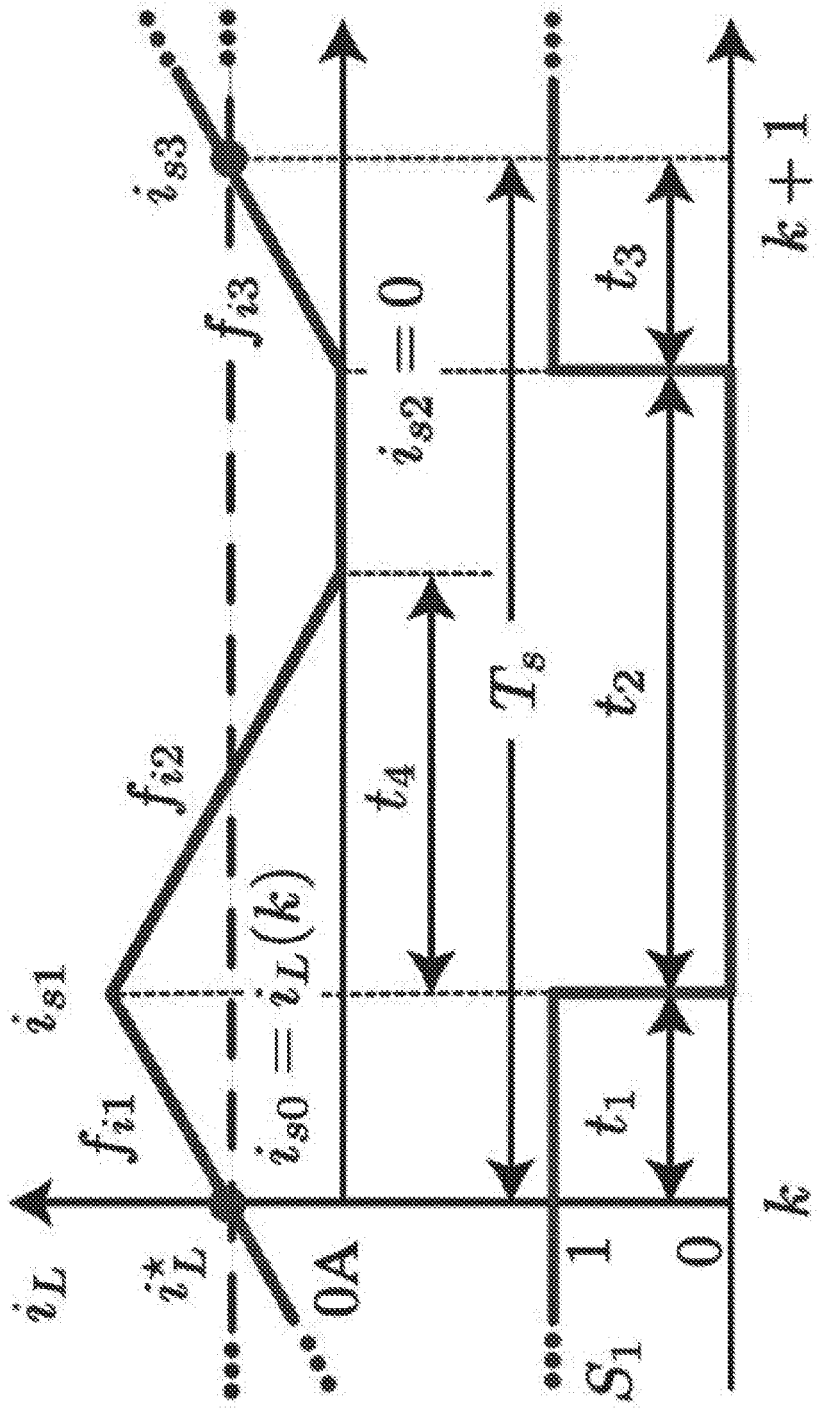
FIG. 7 depicts an example diagram of current flowing through an inductor included in a converter operating in discontinuous conduction mode.

FIG. 7 illustrates the evolution of current flowing through inductor 202 over the course of one sampling period while the converter 106 operates in DCM. As shown in FIG. 7, evolution of the inductor current while converter 106 operates in DCM differs from the evolution of inductor current while converter 106 operates in CCM, and thus, Equations 18 and 19 are no longer applicable. Rather, the inductor current controller 505 is configured to use a different set of equations to the desired on-time of switch 206 while converter 106 operates in DCM.

As shown in FIG. 7, the inductor valley current, or the minimum value of current flowing through inductor 202, is zero while converter 106 operates in DCM. The amount of time ($t_4$) it takes for the inductor current to reach zero can be determined using Equations 20 and 21.

$$i_{s2} = i_L[k] + f_{i1}t_1 + f_{i2}t_4 = 0 \quad \text{[Equation 20]}$$

$$t_4 = \frac{-(i_L[k] + f_{i1}t_1)}{f_{i2}} \quad \text{[Equation 21]}$$

Furthermore, while converter 106 is operating in the steady state, an approximate prediction of the average inductor current in DCM is expressed by Equation 22.

$$i_L^*[k+1] \approx i_L[k] + f_{i1}t_1 + f_{i2}t_4 + f_{i3}t_3 \quad \text{[Equation 22]}$$

$$i_L^*[k+1] \approx i_L[k] + 2f_{i1}t_1 + f_{i2}t_4$$

Therefore, by combing Equations 21 and 22, Equation 23 is provided for calculating the required on-time of switch 206 to minimize the tracking error during DCM operation. That is, while the converter 106 operates in DCM, the inductor current controller 505 is configured to calculate the required on-time of switch 206 using Equation 23.

$$i_L^*[k+1] \approx i_L[k] + 2f_{i1}t_1 - (i_L[k] + f_{i1}t_1) \quad \text{[Equation 23]}$$

$$t_1 \approx \frac{i_L^*[k+1]}{f_{i1}}$$

In some embodiments, the controller 108 included in SMPS 100 is implemented using resource constrained processors, such as fixed-point processors. In such embodiments, the inductor current controller 505 calculates the required on-time of switch 206 using the above equations without sacrificing too much accuracy.

However, in some embodiments, controller 108 is resource relaxed. That is, in some embodiments, the controller 108 is capable of performing relatively more intensive processing tasks than resource constrained processors. In such embodiments, the inductor current controller 505 may be configured to use an exact expression for inductor current when determining the required on-time of switch 206 for DCM operation. Equation 24 provides an exact expression for inductor current while converter 106 operates in DCM. Solving Equation 24 results in a quadratic equation, which can be rearranged as Equation 25. Accordingly, the inductor current controller 505 may be further configured to use Equation 25 for calculating the on-time of switch 206 required to minimize tracking error during DCM operation of the converter 106.

$$i_L^*[k+1] = \frac{1}{T_s}\left(\int_0^{t_1}(i_{so} + f_{i1}t)dt + \int_0^{t_3}(f_{i3}t)dt + \frac{i_{s1}}{2}t_4\right) \quad \text{[Equation 24]}$$

$$i_L^*[k+1] = \frac{1}{T_s}\left(t_1 i_{so} + \frac{1}{2}(f_{i1}t_1^2 + f_{i3}t_3^2 + i_{s1}t_4)\right)$$

10

-continued $$0 = t_1^2(f_{i1}(2f_{i2} - f_{i1}) + t_1(2i_L[k](f_{i2} - f_{i1})) - (2T_s i_L^*[k+1] + i_L^2[k])$$

$$t_1 = \frac{i_L[k](f_{i1} - f_{i2}) \pm \sqrt{i_L^2 f_{i2}^2 + (2f_{i1}T_s i_L^*[k+1])(2f_{i2} - f_{i1})}}{f_{i1}(2f_{i2} - f_{i1})} \quad \text{[Equation 25]}$$

As described above with respect to CCM operation, the inductor current controller 505 is further configured to control switch 206 with a duty cycle that is based on the calculated on-time of switch 206 for DCM operation of the converter 106. The duty cycle is equivalent to the calculated on-time divided by the duration of one sampling period.

Output Voltage Controller

The output voltage controller 510 may be implemented as a dynamic and steady-state current reference generator (D&SS RG), which is configured to calculate an average inductor current that minimizes output voltage tracking error. When the inductor current controller 505 controls switch 206 with a duty cycle that is determined using Equations 19, 23, and/or 25, step changes in inductor current setpoints may cause undesirable output voltage dynamics. Thus, to overcome these undesirable output voltage dynamics, the output voltage controller 510 is configured to calculate a blend of dynamic and steady-state current references. When the output voltage controller 510 moves to a new output voltage setpoint, the dynamic current reference is used. In contrast, when the output voltage controller 510 arrives at this new output voltage setpoint, the steady-state current reference is used.

To further subdue the aggressive inductor current controller 505, the dynamic current reference is configured to limit the slew rate of the output voltage. The slew rate ($f_v$) is a constant rate of change that is set by a user. Equation 26 below provides an equation for the slew rate.

$$v_o^*[k+1] = v_o[k] + f_v T_{SW} \quad \text{[Equation 26]}$$

$$f_v = \frac{v_o^*[k+1] - v_o[k]}{\tau_{SW}}$$

When a value of the slew rate has been set by a user, the output voltage controller 510 is configured to determine a value of the dynamic inductor current reference $$(i_L^D),$$

that will yield the desired incremanetal change in output voltage. If power losses in the converter 106 are neglected, a simple power balance expression, such as Equation 27 below, can be rearranged to solve for the dynamic inductor current reference. Accordingly, Equation 28 below may be used by the output voltage controller 510 to calculate the value of the dynamic inductor current reference that will yield the desired incremanetal change in output voltage. Please note that the notation "^" used in Equation 28 and other Equations hereinafter indicates that the notated value is an estimate. For example, the value of the output impedance, ($\widehat{Z_o}$), in Equation 28 is an estimate and is not explicitly measured.

$$V_{in}[k+1] * i_L^D[k+1] = v_o^*[k+1](i_o[k+1] + i_c[k+1]) \quad \text{[Equation 27]}$$

$$i_L^D[k+1] = \frac{(v_o^*[k+1] + f_v T_{SW})(v_o^*[k+1] + f_v T_{SW} + \hat{Z}_o[k+1] * C * f_v)}{V_{in}[k+1] * \hat{Z}_o[k+1]} \quad \text{[Equation 28]}$$

In the steady state, the inductor current needed to yield a desired output voltage is trivial. The steady-state power balance expression, provided below by Equation 29, can be rearranged to solve for the value of the steady-state inductor current reference $$(i_L^{ss})$$

that will yield the desired incremanetal change in output voltage. Accordingly, Equation 30 may be used by the output voltage controller 510 to calculate the desired steady-state inductor current reference.

$$V_{in}[k] * i_L^{ss}[k] = \frac{(v_o^*[k])^2}{\hat{Z}_o} \quad \text{[Equation 29]}$$

$$i_L^{ss}[k] = \frac{(v_o^{ss*})^2}{V_{in}[k] * \hat{Z}_o}, \text{ where } V_{in}[k] \approx V_{in}[k+1] \quad \text{[Equation 30]}$$

However, as described above, the value of the output impedance in Equations 28-30 cannot be directly calculated. Rather, a value of the output impedance is merely estimated. Thus, the exact value of the output current flowing through the output impedance cannot be known without using an expensive output current sensor. Fortunately, as will be described in more detail with respect to state estimator 515, a virtual sensor may be used to accurately estimate the output impedance.

To combine Equations 28 and 30 into a single current reference, a variable alpha ($\alpha$) is introduced. Alpha represents the normalized output voltage tracking error ($e_v$) and includes a tuning parameter ($N^*$). The tuning parameter biases the dynamic and steady-state current references by inflating the tracking error. For example, when the tracking error increases, alpha also increases and the output voltage slews along the dynamic current reference of Equation 28 to the new setpoint. Likewise, when the tracking error decreases, alpha also decreases, and preference transitions to the steady-state current reference of Equation 30. Equation 31 provides an expression for alpha and Equation 32 provides an expression for a combined single current reference used by voltage output controller 510.

$$\alpha = N^* \frac{|v_o^*[k+1] - \hat{v}_o[k]|}{v_o^*[k+1]} = N^* \frac{|e_v[k+1]|}{v_o^*[k+1]} \quad \text{[Equation 31]}$$

Where: $N^* > 1$ and $\alpha \in [0, 1]$ $$i_L^*[k+1] = \alpha * i_L^D[k+1] + (1-\alpha) * i_L^{ss}[k+1] \quad \text{[Equation 32]}$$

State Estimator

The state estimator 515 is configured to estimate the output current ($i_o$) and the voltage across capacitor 208, thereby obviating the need for calculating output impedance as required by Equations 28 and 30. In some embodiments, the state estimator 515 is implemented as a Luenberger observer. In such embodiments, the state estimator 515 is configured to determine a full-state estimation of the converter 106 even when the state estimator 515 is provided with incomplete state information.

Figure 8:
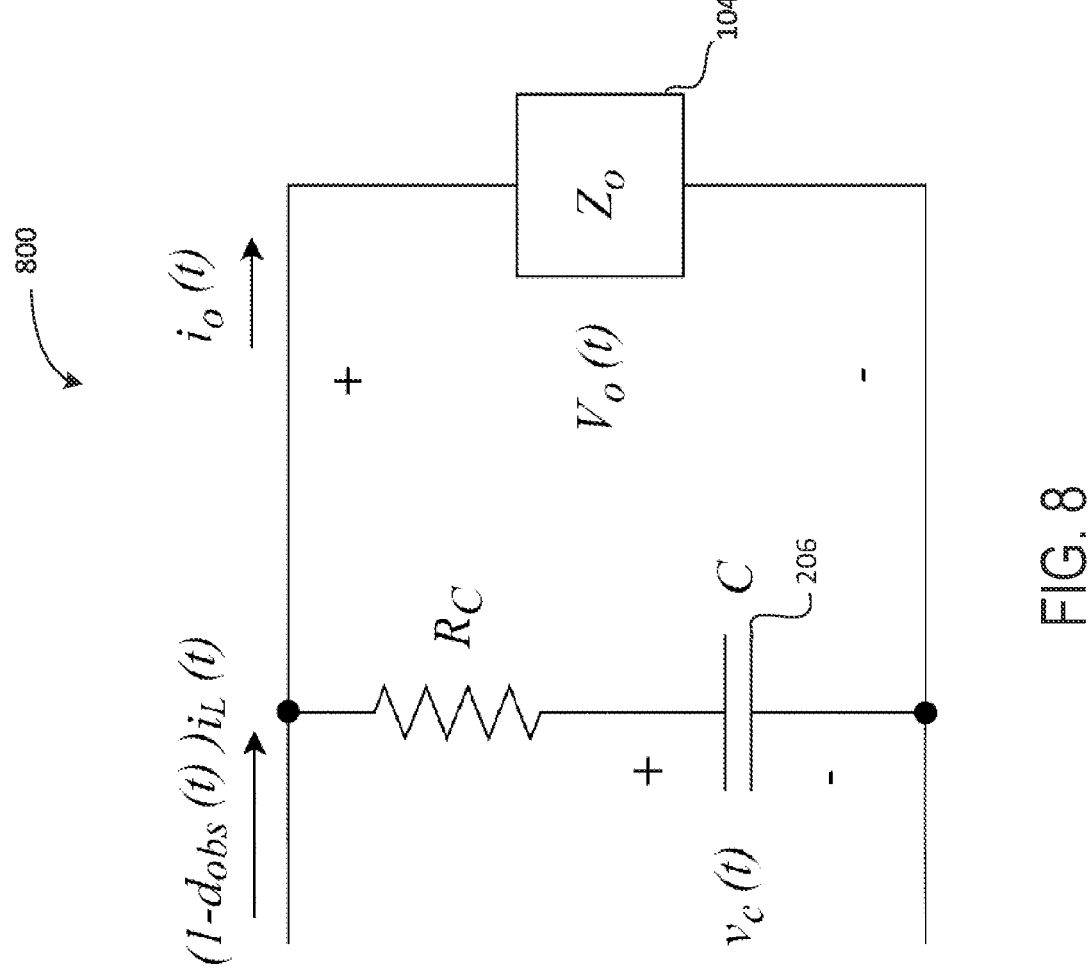
FIG. 8 depicts an example equivalent output circuit of the converter of FIG. 2.

FIG. 8 illustrates an equivalent circuit 800 that represents the output of converter 106. When viewed from a time-averaged perspective, the control input of circuit 800 is proportional to the product of the average inductor current and any leftover duty cycle from Equations 19, 23, and 25. The subscript "obs" denotes that from an observer's perspective, a different duty cycle applies for CCM and DCM. As will be described further below, when the converter 106 operates in DCM, the amount of time for which the inductor valley current is present does not equal the amount of time for which switch 206 is turned OFF.

When Kirchhoff's Current Law (KCL) is applied to circuit 800, and a forward-Euler approximation is applied to the continuous-time expression resulting from the application of KCL, a discrete time expression for the voltage across capacitor 208 is provided by Equation 33.

$$d_{obs}(t) * i_L(t) = i_o(t) + i_c(t) \quad \text{[Equation 33]}$$

$$v_c[k+1] = v_c[k] - \frac{T_s}{C} i_o[k] + \frac{T_s}{C}(d_{obs}[k] * i_L[k])$$

Equation 33 may be combined with an adaptation Equations 12 and 13 to yield a discrete time state space model of the output circuit 800 of converter 106. The discrete time state space model of circuit 800 is provided by Equations 34 and 35 below. In addition, Equation 36 provides an expression that estimates a value of the output impedance based on the voltage across capacitor 208.

$$\begin{bmatrix} \hat{v}_c[k+1] \\ \hat{i}_o[k+1] \end{bmatrix} = \begin{bmatrix} 1 & \frac{-T_s}{C} \\ 0 & 1 \end{bmatrix} \begin{bmatrix} v_c[k] \\ i_o[k] \end{bmatrix} + \begin{bmatrix} \frac{T_s}{C} \\ 0 \end{bmatrix} (d_{obs}[k] * i_L[k]) \quad \text{[Equation 34]}$$

$$x[k+1] = Ax[k] + B\bar{u}[k]$$

$$\hat{v}_o[k] = \begin{bmatrix} \frac{Z_o}{Z_o + R_C} & 0 \end{bmatrix} \begin{bmatrix} v_c[k] \\ i_o[k] \end{bmatrix} + \frac{T_s}{C}(d_{obs}[k] * i_L[k]), \text{ where } \hat{v}_o[k] \approx \hat{v}_o[k+1]$$

$$y[k] = Cx[k] + D\bar{u}[k] \quad \text{[Equation 35]}$$

$$\quad \text{[Equation 36]}$$

$$\hat{Z}_n[k+1] = \frac{\hat{i}_o[k+1]}{\hat{v}_o[k]} = \frac{\hat{i}_o[k+1]}{\begin{bmatrix} \frac{Z_o}{Z_o + R_C} & 0 \end{bmatrix} \begin{bmatrix} \hat{v}_c[k] \\ \hat{i}_o[k] \end{bmatrix} + \frac{T_s}{C}(d_{obs}[k] * i_L[k])}$$

As described above, in some embodiments, the state estimator 515 is implemented as a Luenberger observer. In such embodiments, a model of the discrete-time Luenberger observer is provided by combining Equations 34 and 35. Equation 37 below provides a model for the state estimator 515 when implemented as a Luenberger observer. The observer gain (L) is determined using known methods and may be implemented using a Kalman Filter.

$$\hat{x}[k+1] = A\hat{x}[k] + B\bar{u}[k] + L(\hat{y}[k] - y[k]) \quad \text{Equation (37)}$$
$$= A\hat{x}[k] + B\bar{u}[k] + L(C\hat{x}[k] + D\bar{u}[k] - y[k])$$

Referring back to FIGS. 6 and 7, the slope of the inductor valley current (e.g., the slope of the inductor current as it decreases to a minimum value) occurs for different lengths of time in CCM and DCM. Therefore, different inputs to the state estimator 515 apply for CCM and DCM operation of the converter 106. For example, the slope of the inductor valley current is present for time (t₂) during CCM, and the slope of the inductor valley current is present for time (t₄) during DCM. Accordingly, Equation 38 provides an expression for the inputs to state estimator 515 during CCM and DCM operation, respectively.

$$\bar{u}[k] = \begin{cases} \dfrac{t_2}{T_{sw}}, CCM \\ \dfrac{t_4}{T_{sw}}, DCM \end{cases} \qquad \text{Equation (38)}$$

Method of Controlling SMPS

Figure 9:
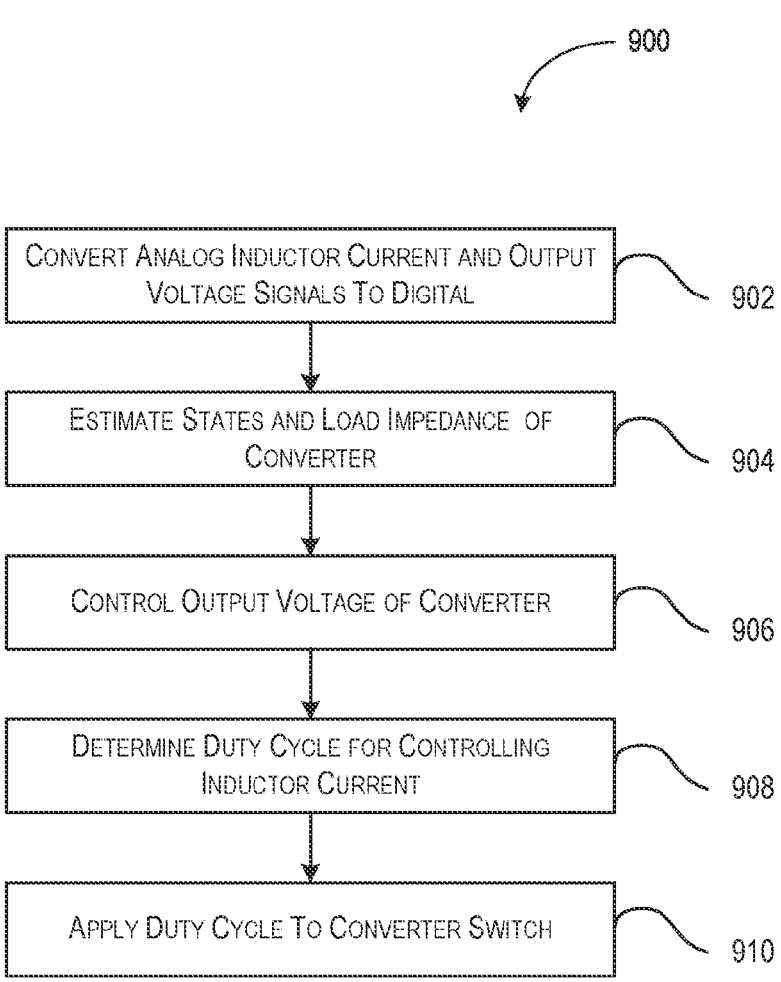
FIG. 9 depicts an example process for controlling the switched-mode power supply.

The above-described model of converter 106 and related Equations are used by the controller 108 to control operation of the SMPS 100. FIG. 9 provides a method 900 of controlling operation of the SMPS 100. The method 900 is performed by the controller 108, and the various steps included in method 900 may be performed by one or more of the different processor modules included in controller 108. For example, the current inductor controller 505, the output voltage controller 510, the state estimator 515, the PWM module 520, and/or the ADC module 525 may be configured to perform one or more of the steps included in method 900.

Figure 10:
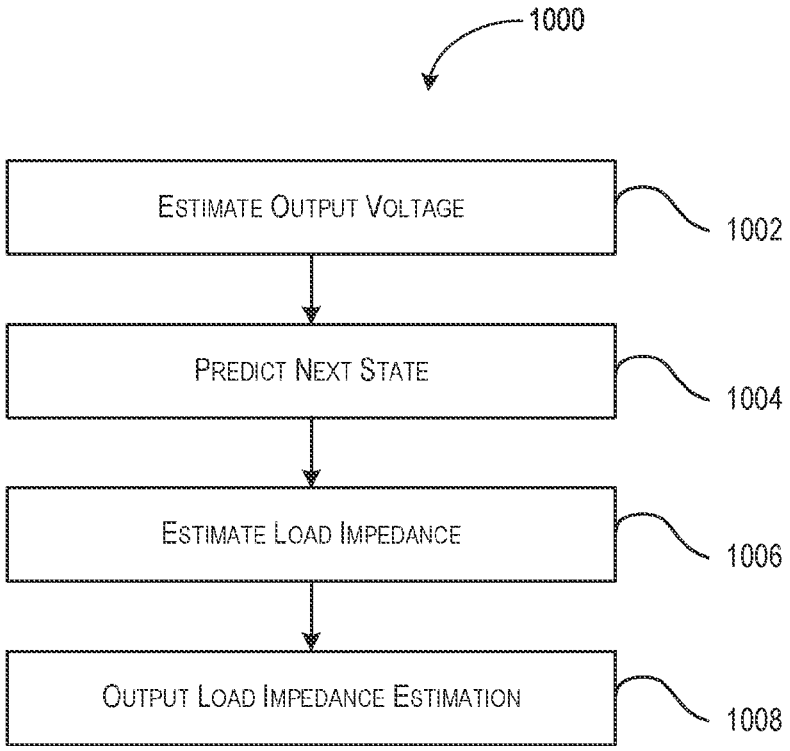
FIG. 10 depicts an example process for estimating the load impedance of the converter of FIG. 2.

At step 902, the ADC module 525 converts analog signals of the inductor current and output voltage received from converter 106 to digital signals. The digital inductor current and output voltage signals are then provided to the state estimator 515. At step 904, the state estimator 515 estimates the next states and the load impedance of the converter 106 based on the signals received from ADC module 525. FIG. 10 provides a method 1000 of estimating the next states and load impedance of converter 106. Method 1000 is described as being performed by the state estimator 515. However, in some embodiments, method 1000 is generally performed by the controller 108, performed by the inductor current controller 505, and/or performed by the output voltage controller 510 instead of or in combination with the state estimator 515.

At step 1002, the state estimator 515 is configured to estimate the output voltage of the converter 106. For example, the state estimator 515 may be configured to estimate the output voltage of converter 106 by using Equation 35. At step 1004, the state estimator 515 is configured to predict the next state of converter 106 based in-part on the estimated output voltage of converter 106. For example, the state estimator 515 may be configured to use Equations 34, 35, and/or 37 to estimate the next states of converter 106. At step 1006, the state estimator 515 is configured to estimate the load, or output impedance, of converter 106 based in-part on the estimated next states of converter 106. For example, the state estimator 515 may be configured to use Equation 36 to estimate the load impedance of converter 106. At step 1008, the estimated load impedance and/or estimated next states of converter 106 are provided to output voltage controller 510.

Figure 11:
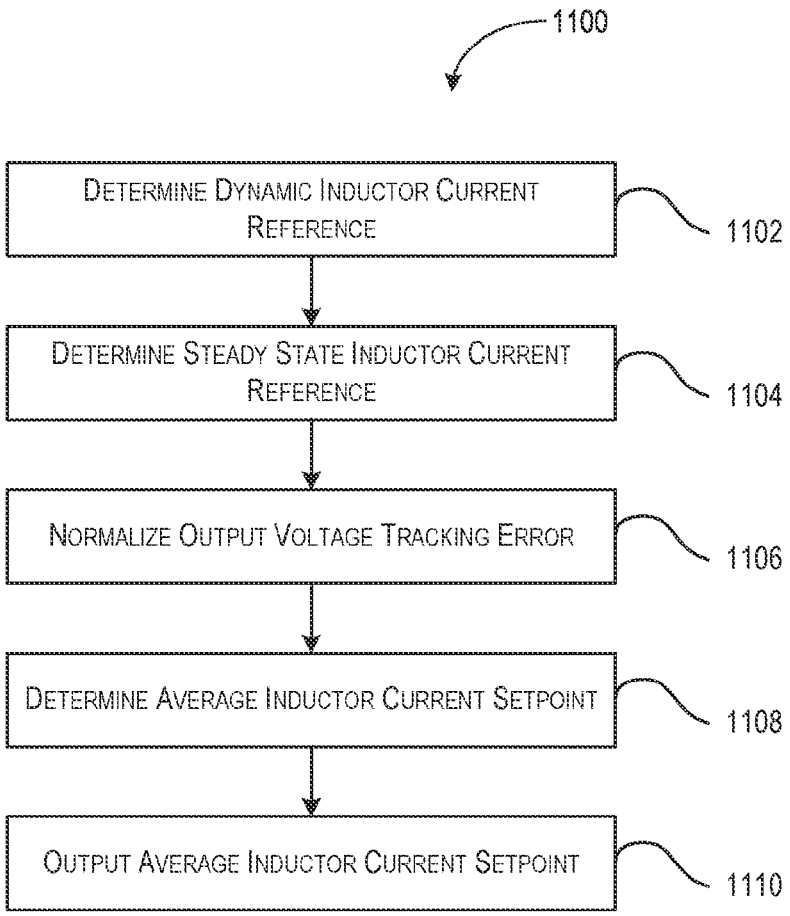
FIG. 11 depicts an example process for controlling the output voltage of the converter of FIG. 2.

Referring back to method 900, at step 906, the output voltage controller 510 controls the output voltage of converter 106. Controlling the output voltage of converter 106 may, for example, include determining an inductor current setpoint. FIG. 11 provides a method 1100 of controlling the output voltage of converter 106. Method 1100 is described as being performed by the output voltage controller 510. However, in some embodiments, method 1100 is generally performed by the controller 108, performed by the inductor current controller 505, and/or performed by the state estimator 515 instead of or in combination with the output voltage controller 510.

At step 1102, the output voltage controller 510 is configured to determine a dynamic inductor current reference. For example, the output voltage controller 510 may be configured to use Equation 28 to calculate the next dynamic inductor current reference as shown below:

$$i_L^D[k+2] = \frac{(v_o^*[k+1] + f_v T_{SW})(v_o^*[k+1] + f_v T_{SW} + \hat{Z}_o^-[k+1] * C * f_v)}{V_{in}[k+1] * \hat{Z}_o^-[k+1]}$$

At step 1104, the output voltage controller 510 is configured to determine a steady-state inductor current reference. For example, the output voltage controller 510 may be configured to use Equation 30 to calculate the steady-state inductor current reference as shown below:

$$i_L^{ss}[k+2] = \frac{(v_o^{ss*}[k+2])^2}{V_{in}[k+1] * \hat{Z}_{i}[k+2]}, \text{ where } V_{in}[k] \approx V_{in}[k+1]$$

At step 1106, the output voltage controller 510 is configured normalize the output voltage tracking error. For example, the output voltage controller 510 may be configured to use Equation 31 to normalize the output voltage tracking error as shown below:

$$\alpha = N * \frac{|v_o^*[k+2] - \hat{v}_o[k+1]|}{v_o^*[k+2]}, 0 < \alpha < 1$$

At step 1108, the output voltage controller 510 is configured to determine an average inductor current reference, or setpoint, by combining the dynamic inductor current reference, the steady-state inductor current reference, and the normalized tracking error calculations. For example, the output voltage controller 510 may be configured to use Equation 32 to calculate the average inductor current setpoint as shown below:

$$i_L^*[k+2] = \alpha * i_L^D[k+2] + (1-\alpha) * i_L^{ss}[k+2], \text{ where } 0 < i_L^* < i_L^{MAX}$$

At step 1110, the average inductor current setpoint is provided to the inductor current controller 505 and method 1100 ends.

Figure 12:
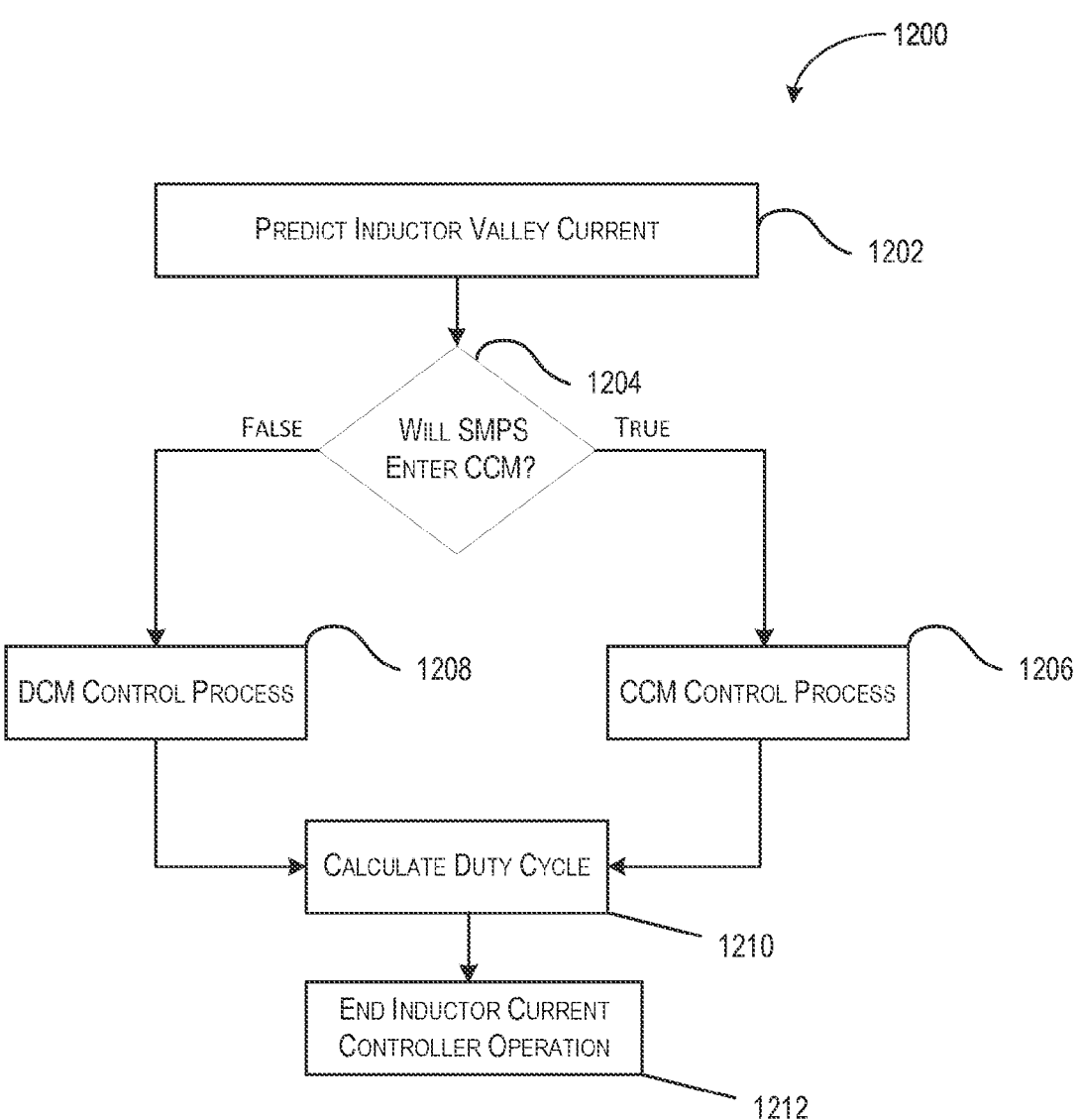
FIG. 12 depicts an example process for controlling the current flowing through the inductor of the converter of FIG. 2.

Referring back to method 900, at step 908, the inductor current controller 505 is configured to control the current flowing through inductor 202. Controlling the current that flows through inductor 202 may, for example, include determining a duty cycle used to control switch 206 and controlling switch 206 with the determined duty cycle. FIG. 12 provides a method 1200 of controlling the current that flows through the inductor 202. Method 1200 is described as being performed by the inductor current controller 505. However, in some embodiments, method 1200 is generally performed by controller 108, performed by the output voltage controller 510, and/or performed by the state estimator 515 instead of or in combination with the inductor current controller 505.

At step 1202, the inductor current controller 505 is configured to predict the next value of the inductor valley current. For example, the inductor current controller 505 may be configured to use Equation 39, provided below, to predict the next value of the inductor valley current.

$$i_{s2}[k+1] = i_L[k] + f_{i1}[k]t_1[k] + f_{i2}[k]t_2[k] \quad \text{[Equation 39]}$$

At step 1204, the inductor current controller 505 determines whether converter 106 will enter CCM or DCM based on the predicted inductor valley current value. If the predicted inductor valley current is greater than zero, the inductor current controller 505 is configured to determine that converter 106 is operating in CCM and method 1200 proceeds to step 1206. However, if the predicted inductor valley current is less than zero, the inductor current controller 505 is configured to determine that converter 106 is operating in DCM and method 1200 proceeds to step 1208.

Figure 13:
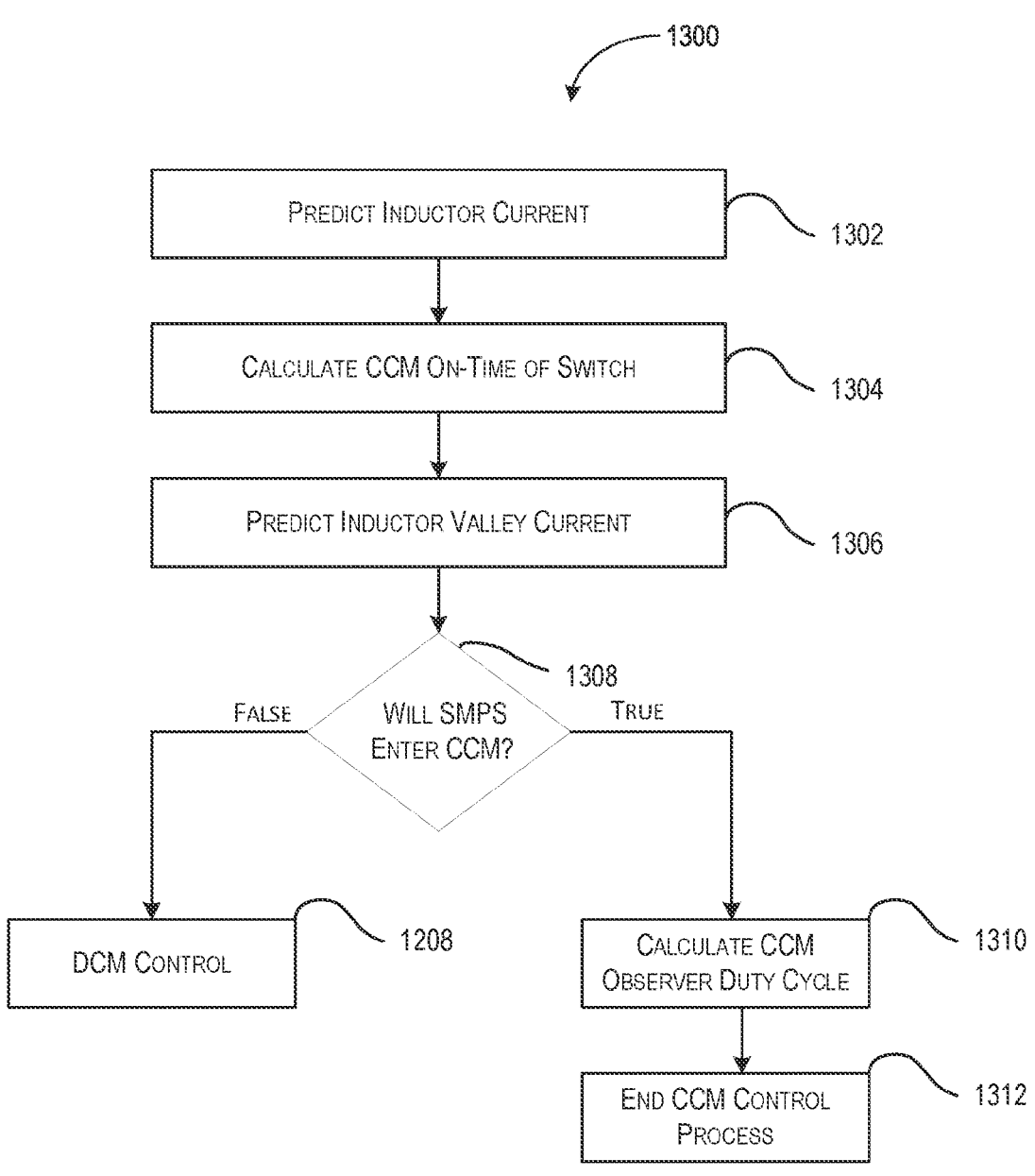
FIG. 13 depicts an example control process for continuous conduction mode operation of the converter of FIG. 2.

At step 1206, the inductor current controller 505 is configured to perform a CCM control process for determining an observed duty cycle value of switch 206 while converter 106 operates in CCM. FIG. 13 provides a method 1300 of performing the CCM control process. Method 1300 is described as being performed by the inductor current controller 505. However, in some embodiments, method 1300 is generally performed by controller 108, performed by the output voltage controller 510, and/or performed by the state estimator 515 instead of or in combination with the inductor current controller 505.

At step 1302, the inductor current controller 505 is configured to predict the value of the inductor current. For example, the inductor current controller 505 may be configured to use Equation 40, provided below, to predict the value of the inductor current based on the previously determined inductor valley current.

$$i_L[k+1] = i_{s2}[k+1] + f_{i1}[k]t_1[k] \quad \text{[Equation 40]}$$

At step 1306, the inductor current controller 505 is configured to again predict the next inductor valley current value. For example, the inductor current controller 505 may be configured to use Equation 39 to predict the next value of the inductor current valley. At step 1308, the inductor current controller 505 will again determine whether converter 106 will enter CCM or DCM based on the predicted inductor valley current value. If the predicted inductor valley current is greater than zero, the inductor current controller 505 is configured to determine that converter 106 is operating in CCM and method 1300 proceeds to step 1310. However, if the predicted inductor valley current is less than zero, the inductor current controller 505 is configured to determine that converter 106 is operating in DCM and method 1300 proceeds to step 1208 of method 1200.

At step 1310, the inductor current controller 505 is configured to calculate the CCM observer duty cycle of switch 206. For example, the inductor current controller 505 may be configured to use Equation 41, provided below, to calculate the CCM observer duty cycle of switch 206. The on-time ($t_1$) of switch 206, included in Equation 41 below, is calculated using Equation 19.

$$d_{obs}[k+1] = \frac{T_{sw} - 2t_1[k+1]}{T_{sw}} \quad \text{[Equation 41]}$$

At step 1312, the inductor current controller 505 ends the CCM control process and proceeds to step 1210 of method 1200.

Figure 14:
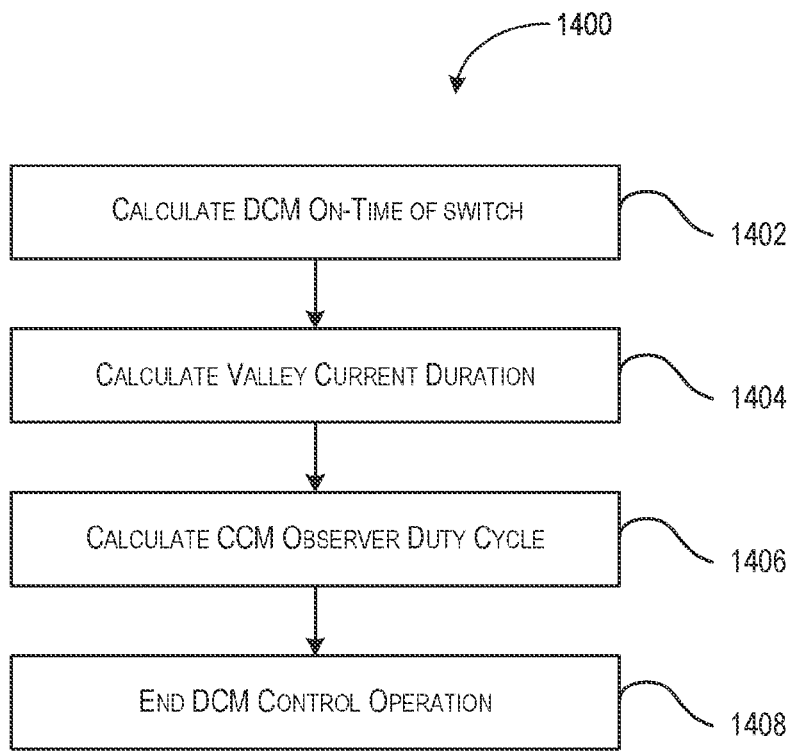
FIG. 14 depicts an example control process for discontinuous conduction mode operation of the converter of FIG. 2.

Referring back to method 1200, at step 1208, the inductor current controller 505 is configured to perform a DCM control process for determining an observed duty cycle of the switch 206 while converter 106 operates in DCM. FIG. 14 provides a method 1400 of performing the DCM control process. Method 1400 is described as being performed by the inductor current controller 505. However, in some embodiments, method 1400 is generally performed by controller 108, performed by the output voltage controller 510, and/or performed by the state estimator 515 instead of or in combination with the inductor current controller 505.

At step 1402, the inductor current controller is configured to calculate the on-time of switch 206 while the converter 106 operates in DCM. For example, the inductor current controller 505 may be configured to use either Equation 23 or Equation 25 to calculate the on-time of switch 206. At step 1404, the inductor current controller is configured to calculate the duration for which the inductor valley current flows through inductor 202. For example, the inductor current controller may be configured to use Equation 21 to calculate the duration ($t_4$) of the inductor valley current as shown below:

$$t_4[k+1] = \frac{-(i_L[k+1]] + f_{i1}[k+1]t_1[k+1])}{f_{i2}[k+1]}$$

At step 1406, the inductor current controller 505 is configured to calculate the DCM observer duty cycle of switch 206. For example, the inductor current controller 505 may be configured to use Equation 42, provided below, to calculate the DCM observer duty cycle of switch 206.

$$d_{obs}[k+1] = \frac{T_{sw} - 2t_1[k+1]}{T_{sw}} \quad \text{[Equation 42]}$$

At step 1408, the inductor current controller 505 ends the DCM control process and proceeds to step 1210 of method 1200. Referring back to method 1200, as step 1210, the inductor current controller 505 is configured to calculate the duty cycle used for controlling the switch 206 included in converter 106. For example, the inductor current controller 505 may be configured to use Equation 43, provided below, to calculate the duty cycle used to control switch 206.

$$d[k+1] = \frac{2t_1[k+1]}{T_{sw}} \quad \text{[Equation 43]}$$

When using Equation 43 to calculate the duty cycle of switch 206, the inductor current controller 505 determines the value of the on-time ($t_1$) included in Equation 43 based on whether converter 106 is operating in CCM or DCM. As described above, when the converter 106 is operating in CCM, the inductor current controller 505 may be configured to use Equation 19 to calculate calculating the on-time of switch 206 that is used to calculate the duty cycle. However, when the converter 106 is operating in DCM, the inductor current controller 505 may be configured to use either Equation 23 or Equation 25 for calculating the on-time of switch 206 that is used to calculate the duty cycle. Thus, the inductor current controller 505 is configured to calculate a first duty cycle for controlling switch 206 when the converter 106 is operating in CCM. Furthermore, the inductor current controller 505 is configured to calculate a second duty cycle for controlling switch 206 when the converter 106 is operating in DCM.

At step 1212, the inductor current controller 505 ends method 1200 and returns to step 910 of method 900. At step 910, the inductor current controller 505 is configured to control the switch 206 using the duty cycle determined in method 1200. For example, the inductor current controller 505 may be configured to provide the determined duty cycle to PWM module 520, which is configured to control switch 206 using the determined duty cycle.

Effects

Systems, methods, and devices in accordance with the present disclosure may take any one or more of the following configurations.

(1) A switched-mode power supply comprising: a voltage source, an output device, a converter including an inductor and a switch, the converter configured to convert unregulated direct current (DC) voltage received from the voltage source to a regulated DC voltage used for powering the output device, and a controller including one or more electronic processors. The controller is configured to: determine whether a predicted value of current flowing through the inductor is greater than zero, determine the converter is operating in continuous conduction mode (CCM) when the predicted value of the current is greater than zero, control the switch using a first duty cycle when the converter is operating in CCM, determine the converter is operating in discontinuous conduction mode (DCM) when the predicted value of the current is less than zero, and control the switch using a second duty cycle when the converter is operating in DCM.

(2) The switched-mode power supply according to (1), wherein the controller is further configured to: receive a first signal indicative of a voltage across the output device, receive a second signal indicative of a current flowing into the converter, and estimate an impedance of the output device based on the voltage across the output device and the current flowing into the converter, wherein a value of the current flowing into the converter is measured or estimated.

(3) The switched-mode power supply according to (2), wherein the controller is further configured to: determine a setpoint for the current flowing through the inductor based on the impedance of the output device and determine the predicted value of the current flowing through the inductor based on the setpoint.

(4) The switched-mode power supply according to any one of (1)-(3), wherein the controller is further configured to: determine the first duty cycle based on a property of the switch during CCM operation of the converter.

(5) The switched-mode power supply according to (4) wherein the property of the switch is an on-time of the switch during one cycle of operation of the converter and wherein the controller is further configured determine the on-time of the switch based on an estimated average of current flowing through the inductor.

(6) The switched-mode power supply according to any one of (1) to (5), wherein the controller is further configured to: determine the second duty cycle based on a property of the switch during DCM operation of the converter.

18

(7) The switched-mode power supply according to (6), wherein the property of the switch is an on-time of the switch during one cycle of operation of the converter and wherein the controller is further configured determine the on-time of the switch based on an estimated value of current flowing through the inductor.

(8) The switched-mode power supply according to (6), wherein the property of the switch is an on-time of the switch during one cycle of operation of the converter and wherein the controller is further configured determine the on-time of the switch based on an exact value of current flowing through the inductor.

(9) The switched-mode power supply according to any one of (1) to (8), wherein the switched-mode power supply is included in a portable speaker.

(10) The switched-mode power supply according to any one of (1) to (9), wherein the converter is a non-synchronous boost converter.

(11) A method for controlling a switched-mode power supply, the switched-mode power supply including a converter circuit that includes and inductor and a switch, the method comprising: determining whether a predicted value of current flowing through the inductor is greater than zero, determining the converter circuit is operating in continuous conduction mode (CCM) when the predicted value of the current is greater than zero, controlling the switch using a first duty cycle when the converter is operating in CCM, determining the converter is operating in discontinuous conduction mode (DCM) when the predicted value of the current is less than zero, and controlling the switch using a second duty cycle when the converter is operating in DCM.

(12) The method according to (11), further comprising: receiving a first signal indicative of a voltage across the output device, receiving a second signal indicative of a current flowing into the converter circuit, and estimating an output impedance of the converter circuit based on the output voltage and the current flowing into the converter circuit, wherein a value of the current flowing into the converter circuit is measured or estimated.

(13) The method according to (12), further comprising: determining a setpoint for the current flowing through the inductor based on the output impedance.

(14) The method according to (13), further comprising: determining the predicted value of the current flowing through the inductor based on the setpoint.

(15) The method according to any one of (11) to (14), further comprising: determining the first duty cycle based on an on-time of the switch during CCM operation of the converter circuit.

(16) The method according to (15), further comprising: determining the on-time of the switch based on an estimated average of current flowing through the inductor.

(17) The method according to any one of (11) to (16), further comprising: determining the second duty cycle based on a property of the switch during DCM operation of the converter.

(18) The method according to (17), further comprising: determining the second duty cycle based on an on-time of the switch during DCM operation of the converter.

(19) The method according to (17), further comprising: determining the on-time of the switch based on an exact value of current flowing through the inductor.

(20) A non-transitory computer-readable medium storing instructions that, when executed by an electronic processor, cause the electronic processor to perform operations according to any one of (11) to (19).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Various aspects of the present invention may be appreciated from the following enumerated example embodiments (EEEs):

EEE1. A switched-mode power supply comprising:
a voltage source;
an output device;
a converter including an inductor and a switch, the converter configured to convert unregulated direct current (DC) voltage received from the voltage source to a regulated DC voltage used for powering the output device; and
a controller including one or more electronic processors, the controller configured to:
determine whether a predicted value of current flowing through the inductor is greater than zero;

determine the converter is operating in continuous conduction mode (CCM) when the predicted value of the current is greater than zero;
control the switch using a first duty cycle when the converter is operating in CCM;
determine the converter is operating in discontinuous conduction mode (DCM) when the predicted value of the current is less than zero; and
control the switch using a second duty cycle when the converter is operating in DCM.

EEE2. The switched-mode power supply of EEE 1, wherein the controller is further configured to:
receive a first signal indicative of a voltage across the output device;
receive a second signal indicative of a current flowing into the converter; and
estimate an impedance of the output device based on the voltage across the output device and the current flowing through the output device;
wherein a value of the current flowing into the converter is measured or estimated.

EEE3. The switched-mode power supply of EEE 2, wherein the controller is further configured to:
determine a setpoint for the current flowing through the inductor based on the impedance of the output device; and
determine the predicted value of the current flowing through the inductor based on the setpoint.

EEE4. The switched-mode power supply of any one of EEEs 1-3, wherein the controller is further configured to determine the first duty cycle based on a property of the switch during CCM operation of the converter.

EEE5. The switched-mode power supply of EEE 4, wherein the property of the switch is an on-time of the switch during one cycle of operation of the converter; and wherein the controller is further configured determine the on-time of the switch based on a predicted or an estimated average of current flowing through the inductor.

EEE6. The switched-mode power supply of any one of EEEs 1-5, wherein the controller is further configured to determine the second duty cycle based on a property of the switch during DCM operation of the converter.

EEE7. The switched-mode power supply of EEE 6, wherein the property of the switch is an on-time of the switch during one cycle of operation of the converter; and wherein the controller is further configured determine the on-time of the switch based on an estimated value of current flowing through the inductor.

EEE8. The switched-mode power supply of EEE 6, wherein the property of the switch is an on-time of the switch during one cycle of operation of the converter; and wherein the controller is further configured determine the on-time of the switch based on an exact value of current flowing through the inductor.

EEE9. The switched-mode power supply of any one of EEEs 1-8, wherein the switched-mode power supply is included in a portable speaker.

EEE10. The switched-mode power supply of any one of EEEs 1-9, wherein the converter is non-synchronous boost converter.

EEE11. A method for controlling a switched-mode power supply, the switched-mode power supply including a converter circuit that includes an inductor and a switch, the method comprising: determining whether a predicted value of current flowing through the inductor is greater than zero;

determining the converter circuit is operating in continuous conduction mode (CCM) when the predicted value of the current is greater than zero;

controlling the switch using a first duty cycle when the converter is operating in CCM;

determining the converter is operating in discontinuous conduction mode (DCM) when the predicted value of the current is less than zero; and controlling the switch using a second duty cycle when the converter is operating in DCM.

EEE12. The method of EEE 11, further comprising:

receiving a first signal indicative of a voltage across the output device;

receiving a second signal indicative of a current flowing into the converter circuit; and estimating an output impedance of the converter circuit based on the output voltage and the current flowing into the converter circuit;

wherein a value of the current flowing into the converter circuit is measured or estimated.

EEE13. The method of EEE 12, further comprising determining a setpoint for the current flowing through the inductor based on the output impedance.

EEE14. The method of EEE 13, further comprising determining the predicted value of the current flowing through the inductor based on the setpoint.

EEE15. The method of any one of EEEs 11-14, further comprising determining the first duty cycle based on an on-time of the switch during CCM operation of the converter circuit.

EEE16. The method of EEE 15, further comprising determining the on-time of the switch based on a predicted or an estimated average of current flowing through the inductor.

EEE17. The method of any one of EEEs 11-16, further comprising determining the second duty cycle based on a property of the switch during DCM operation of the converter.

EEE18. The method of EEE 17, further comprising determining the on-time of the switch based on an estimated value of current flowing through the inductor.

EEE19. The method of EEE 17, further comprising determining the on-time of the switch based on an exact value of current flowing through the inductor.

EEE20. A non-transitory computer-readable medium storing instructions that, when executed by an electronic processor, cause the electronic processor to perform operations comprising the method of any one of EEEs 11-19.

EEE21. The switched-mode power supply according to any one of EEEs 1-10 or the method according to any one of EEEs 11-19, wherein the second duty cycle is different from the first duty cycle.

EEE22. The switched-mode power supply according to EEE 4 or 6 or anyone of EEEs 5 or 7-10 when dependent on EEE 4 or 6, wherein the property of the switch is an on-time of the switch during one cycle of operation of the converter.

The invention claimed is:

1. A switched-mode power supply comprising:

a voltage source;

an output device;

a converter including an inductor and a switch, the converter configured to convert unregulated direct current (DC) voltage received from the voltage source to a regulated DC voltage used for powering the output device; and a controller including one or more electronic processors, the controller configured to:

receive a first signal indicative of a voltage across the output device;

receive a second signal indicative of a current flowing into the converter; and estimate an impedance of the output device based on the voltage across the output device and the current flowing through the output device using a state estimator;

wherein the state estimator comprises a discrete state space model of the converter and is configured to determine a full-state estimation of the converter from incomplete state information;

wherein a value of the current flowing into the converter is measured or estimated, wherein the controller is further configured to:

determine a setpoint for the current flowing through the inductor based on the impedance of the output device; and determine a predicted value of the current flowing through the inductor based on the setpoint;

determine, in response to the predicted value of the current, an operating mode of the converter, wherein the determined operating mode is a continuous conduction mode (CCM) when the predicted value of the current is greater than zero, and wherein the determined operating mode is a discontinuous conduction mode (DCM) when the predicted value of the current is less than zero; and control the switch in response to the determined operating mode, wherein a first duty cycle is used to control the switch when the converter is operating in CCM and a second duty cycle is used to control the switch when the converter is operating in DCM.

2. The switched-mode power supply according to claim 1, wherein the controller is further configured to determine the first duty cycle based on a property of the switch during CCM operation of the converter.

3. The switched-mode power supply according to claim 2, wherein the property of the switch is an on-time of the switch during one cycle of operation of the converter; and wherein the controller is further configured determine the on-time of the switch based on a predicted or an estimated average of current flowing through the inductor.

4. The switched-mode power supply according to claim 1, wherein the controller is further configured to determine the second duty cycle based on a property of the switch during DCM operation of the converter.

5. The switched-mode power supply according to claim 4, wherein the property of the switch is an on-time of the switch during one cycle of operation of the converter; and wherein the controller is further configured determine the on-time of the switch based on an estimated value of current flowing through the inductor or an exact value of current flowing through the inductor.

6. The switched-mode power supply according to claim 2, wherein the property of the switch is an on-time of the switch during one cycle of operation of the converter.

7. The switched-mode power supply according to claim 6, wherein the controller is further configured to determine the on-time of the switch based on an exact value of current flowing through the inductor.

8. The switched-mode power supply of claim 1, wherein the switched-mode power supply is included in a portable speaker.

9. The switched-mode power supply of claim 1, wherein the converter is non-synchronous boost converter.

10. A method for controlling a switched-mode power supply, the switched-mode power supply including a converter circuit that includes an inductor and a switch, the method comprising:

receiving a first signal indicative of a voltage across the output device;

receiving a second signal indicative of a current flowing into the converter circuit; and estimating an output impedance of the converter circuit based on the output voltage and the current flowing into the converter circuit using a state estimator;

wherein the state estimator comprises a discrete state space model of the converter and is configured to determine a full-state estimation of the converter from incomplete state information;

wherein a value of the current flowing into the converter circuit is measured or estimated, determining a setpoint for the current flowing through the inductor based on the output impedance; and determining a predicted value of the current flowing through the inductor based on the setpoint;

determining, in response to the predicted value of the current, an operating mode of the converter, wherein the determined operating mode is a continuous conduction mode (CCM) when the predicted value of the current is greater than zero, and wherein the determined operating mode is a discontinuous conduction mode (DCM) when the predicted value of the current is less than zero; and controlling the switch in response to the determined operating mode, wherein a first duty cycle is used to control the switch when the determined operating mode is CCM and a second duty cycle is used to control the switch when the converter is operating in DCM.

11. The method according to claim 10, further comprising determining the first duty cycle based on an on-time of the switch during CCM operation of the converter circuit.

12. The method according to claim 11, further comprising determining the on-time of the switch based on a predicted or an estimated average of current flowing through the inductor.

13. The method according to claim 10, further comprising determining the second duty cycle based on an on-time of the switch during DCM operation of the converter.

14. The method according to claim 13, further comprising determining the on-time of the switch based on an estimated value of current flowing through the inductor or an exact value of current flowing through the inductor.

15. A non-transitory computer-readable medium storing instructions that, when executed by an electronic processor, cause the electronic processor to perform operations comprising the method according to 10.

16. The switched-mode power supply according to claim 1, wherein the second duty cycle is different from the first duty cycle.

17. The switched-mode power supply according to claim 2, wherein the property of the switch is an on-time of the switch during one cycle of operation of the converter.

18. The method according to claim 10, wherein the second duty cycle is different from the first duty cycle.

* * * * *